(12) United States Patent
Lee et al.

(10) Patent No.: US 10,750,424 B2
(45) Date of Patent: Aug. 18, 2020

(54) PREEMPTIVE INDICATION OF INTER-RAT MOBILITY

(71) Applicant: QUALCOMM Incorporated, San Diego, CA (US)

(72) Inventors: Kuo-Chun Lee, San Diego, CA (US); Srinivasan Balasubramanian, San Diego, CA (US); Vitaly Drapkin, San Diego, CA (US); Arvind Vardarajan Santhanam, San Diego, CA (US); Abhishek Bhatnagar, San Diego, CA (US); Haris Zisimopoulos, London (GB)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 16/109,009

(22) Filed: Aug. 22, 2018

(65) Prior Publication Data

US 2019/0069210 A1    Feb. 28, 2019

(30) Foreign Application Priority Data

Aug. 25, 2017   (GR) .............................. 20170100390

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0027* (2013.01); *H04W 36/0061* (2013.01);
(Continued)

(58) Field of Classification Search
CPC ..... H04W 36/32; H04W 76/30; H04W 76/27; H04W 76/10; H04W 36/0027;
(Continued)

(56) References Cited

U.S. PATENT DOCUMENTS 9,338,700 B2   5/2016   Schulist et al.
9,843,980 B2   12/2017  Dalsgaard et al.
(Continued)

FOREIGN PATENT DOCUMENTS

WO   WO-2009093946 A1   7/2009
WO   WO-2009102161 A2   8/2009
(Continued)

OTHER PUBLICATIONS

International Search Report and Written Opinion—PCT/US2018/047763—ISA/EPO—dated Oct. 17, 2018.

*Primary Examiner* — Kibrom T Hailu
(74) *Attorney, Agent, or Firm* — Holland & Hart LLP

(57) ABSTRACT

Methods, systems, and devices for wireless communication are described for inter-RAT mobility from a first radio access technology (RAT) to a second RAT, including cases in which different RATs correspond to different generations of networks. Approaches described herein include providing a preemptive indication of inter-RAT mobility for one or more geographic areas such to a user equipment (UE). The UE can thus use a mobility procedure to transition from the first RAT to the second RAT that is supported in the UE's location without first attempting an unsupported mobility procedure, reducing transition latency.

30 Claims, 16 Drawing Sheets

(51) Int. Cl.
*H04W 76/30* (2018.01)
*H04W 76/27* (2018.01)
*H04W 76/10* (2018.01)
*H04W 36/18* (2009.01)
*H04W 60/00* (2009.01)
*H04W 36/14* (2009.01)

(52) U.S. Cl.
CPC ........... *H04W 36/18* (2013.01); *H04W 60/00* (2013.01); *H04W 76/10* (2018.02); *H04W 76/27* (2018.02); *H04W 76/30* (2018.02); *H04W 36/14* (2013.01)

(58) Field of Classification Search
CPC . H04W 36/0061; H04W 36/18; H04W 60/00; H04W 36/14; H04W 68/00; H04W 36/24
See application file for complete search history.

(56) References Cited

U.S. PATENT DOCUMENTS

| | | |
|---|---|---|
| 9,854,496 B2 | 12/2017 | Johansson et al. |
| 2015/0358862 A1 | 12/2015 | Devarayanigari et al. |
| 2016/0286449 A1 | 9/2016 | Choi et al. |
| 2018/0098258 A1 | 4/2018 | Annam et al. |
| 2018/0242271 A1* | 8/2018 | Rune .................. H04W 60/005 |
| 2019/0174554 A1* | 6/2019 | Deenoo ................ H04W 80/02 |
| 2019/0174571 A1* | 6/2019 | Deenoo ................ H04W 76/28 |

FOREIGN PATENT DOCUMENTS

| | | |
|---|---|---|
| WO | WO-2015120724 A1 | 8/2015 |
| WO | WO-2016182662 A1 | 11/2016 |

\* cited by examiner

PREEMPTIVE INDICATION OF INTER-RAT MOBILITY

CROSS REFERENCES

The present Application for Patent claims priority to Greece Provisional Patent Application No. 20170100390 by LEE et al., entitled "Preemptive Indication of Inter-Rat Mobility," filed Aug. 25, 2017, assigned to the assignee hereof, and expressly incorporated by reference in its entirety.

BACKGROUND

The following relates generally to wireless communication, and more specifically to a preemptive indication of inter-RAT mobility.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long-Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may sometimes transition from one radio access technology to another, which may include a transition from one generation of network to another. Further, a system may support a handover procedure for transitioning from one radio access technology to another in some locations but not in other locations. Methods and systems for efficient migration from one radio access technology to another to another are desired.

SUMMARY

The described techniques relate to improved methods, systems, devices, or apparatuses that support a preemptive indication of inter-RAT mobility, which in some cases may include inter-generation mobility. Generally, the described techniques provide for, prior to a time at which a transition from one radio access technology (RAT) to another RAT may occur, preemptively providing to a user equipment (UE) an indication of whether one or more inter-RAT mobility procedures are supported in one or more geographic areas. Upon subsequently changing location, the UE may determine whether to initiate an inter-RAT mobility procedure based at least in part on the indication. Thus, the UE may avoid attempting to utilize a procedure that a network does not support in the UE's new location, which may beneficially reduce latency.

For example, in some wireless communications systems, when a UE updates its location with a node in the system's core network, or at some other preemptive time, the UE may receive from the core network node an indication of whether a connected-mode inter-RAT handover procedure is supported in one or more geographic areas, which may be a selection of geographic areas including or near the UE's current location. If the UE subsequently enters a new geographic area, the UE may determine whether to initiate an inter-RAT mobility procedure based at least in part on the indication the UE previously received from the core network node. For example, if the new geographic area is one in which the connected-mode inter-RAT handover procedure is not supported, as indicated by the indication, the UE may initiate a mobility procedure that includes a radio connection release from a current RAT.

A method of wireless communication is described. The method may include attaching, via a first RAT, to a first base station in a network, receiving, from a core network node of the network and for one or more geographic areas, an indication of inter-RAT connected-mode mobility between the first RAT and a second RAT, and determining whether to initiate an inter-RAT mobility procedure based on entering a geographic area identified by the indication subsequent to attaching to the first base station.

An apparatus for wireless communication is described. The apparatus may include means for attaching, via a first RAT, to a first base station in a network, receiving, from a core network node of the network and for one or more geographic areas, an indication of inter-RAT connected-mode mobility between the first RAT and a second RAT, and determining whether to initiate an inter-RAT mobility procedure based on entering a geographic area identified by the indication subsequent to attaching to the first base station.

Another apparatus for wireless communication is described. The apparatus may include a processor, memory in electronic communication with the processor, and instructions stored in the memory. The instructions may be operable to cause the processor to attach, via a first RAT, to a first base station in a network, receive, from a core network node of the network and for one or more geographic areas, an indication of inter-RAT connected-mode mobility between the first RAT and a second RAT, and determine whether to initiate an inter-RAT mobility procedure based on entering a geographic area identified by the indication subsequent to attaching to the first base station.

A non-transitory computer readable medium for wireless communication is described. The non-transitory computer-readable medium may include instructions operable to cause a processor to attach, via a first RAT, to a first base station in a network, receive, from a core network node of the network and for one or more geographic areas, an indication of inter-RAT connected-mode mobility between the first RAT and a second RAT, and determine whether to initiate an inter-RAT mobility procedure based on entering a geographic area identified by the indication subsequent to attaching to the first base station.

In some examples of the method, apparatus, and non-transitory computer-readable medium described above, receiving the indication of inter-RAT connected-mode mobility comprises receiving a list of the one or more geographic areas in which the UE is to initiate the inter-RAT mobility procedure to transition from the first RAT to the second RAT. In some examples, receiving the indication of inter-RAT connected-mode mobility further comprises receiving an additional list of the one or more geographic areas in which an inter-RAT handover interface is available. In some examples, receiving the indication of inter-RAT connected-mode mobility comprises receiving the indication via a non-access stratum (NAS) layer. In some examples, receiving the indication of inter-RAT connected-mode mobility comprises receiving the indication in conjunction with a location update procedure.

In some examples of the method, apparatus, and non-transitory computer-readable medium described above, the location update procedure comprises a tracking area update (TAU) procedure. In some examples, the location update procedure comprises a registration procedure.

Some examples of the method, apparatus, and non-transitory computer-readable medium described above may further include processes, features, means, or instructions for receiving a Radio Resource Control (RRC) connection release message from the first base station, initiating the inter-RAT mobility procedure based on the UE entering the geographic area identified by the indication, and establishing an RRC connection, via the second RAT, with a target base station using an attach of a handover type or a registration of a handover type.

In some examples of the method, apparatus, and non-transitory computer-readable medium described above, receiving the indication of inter-RAT connected-mode mobility comprises receiving a list of the one or more geographic areas in which an inter-RAT handover interface is not available. In some examples, the first RAT and the second RAT are different generation RATs. In some examples, the first RAT is a long-term evolution (LTE) RAT and the second RAT is a fifth generation (5G) RAT. In some examples, the first RAT is a 5G RAT and the second RAT is a LTE RAT.

A method of wireless communication is described. The method may include receiving, at a core network node of a network, a request to attach, via a first RAT, to a first base station in the network, and sending, from the core network node and for one or more geographic areas, an indication of inter-RAT connected-mode mobility between the first RAT and a second RAT.

An apparatus for wireless communication is described. The apparatus may include means for receiving, at a core network node of the network, a request to attach, via a first RAT, to a first base station in the network, and sending, from the core network node and for one or more geographic areas, an indication of inter-RAT connected-mode mobility between the first RAT and a second RAT.

Another apparatus for wireless communication is described. The apparatus may include a processor, memory in electronic communication with the processor, and instructions stored in the memory. The instructions may be operable to cause the processor to receive, at a core network node of a network, a request to attach, via a first RAT, to a first base station in the network, and send, from the core network node and for one or more geographic areas, an indication of inter-RAT connected-mode mobility between the first RAT and a second RAT.

A non-transitory computer readable medium for wireless communication is described. The non-transitory computer-readable medium may include instructions operable to cause a processor to receive, at a core network node of a network, a request to attach, via a first RAT, to a first base station in the network, and send, from the core network node and for one or more geographic areas, an indication of inter-RAT connected-mode mobility between the first RAT and a second RAT.

In some examples of the method, apparatus, and non-transitory computer-readable medium described above, sending the indication of inter-RAT connected-mode mobility comprises sending a list of the one or more geographic areas in which the UE is to initiate the inter-RAT mobility procedure to transition from the first RAT to the second RAT. In some examples, sending the indication of inter-RAT connected-mode mobility comprises sending an additional list of the one or more geographic areas in which an inter-RAT handover interface is available. In some examples, sending the indication of inter-RAT connected-mode mobility comprises sending the indication via a NAS layer. In some examples, sending the indication of inter-RAT connected-mode mobility comprises sending the indication in conjunction with a location update procedure.

In some examples of the method, apparatus, and non-transitory computer-readable medium described above, the location update procedure comprises a TAU procedure. In some examples, the location update procedure comprises a registration procedure.

Some examples of the method, apparatus, and non-transitory computer-readable medium described above may further include processes, features, means, or instructions for determining inter-RAT connected-mode mobility based on whether an inter-RAT handover interface is present in the one or more geographic areas.

In some examples, sending the indication of inter-RAT connected-mode mobility comprises sending a list of the one or more geographic areas in which an inter-RAT handover interface is not available. In some examples, the first RAT and the second RAT are different generation RATs. In some examples, the first RAT is a LTE RAT and the second RAT is a 5G RAT. In some examples, the first RAT is a 5G RAT and the second RAT is a LTE RAT.

DETAILED DESCRIPTION

Figure 1:
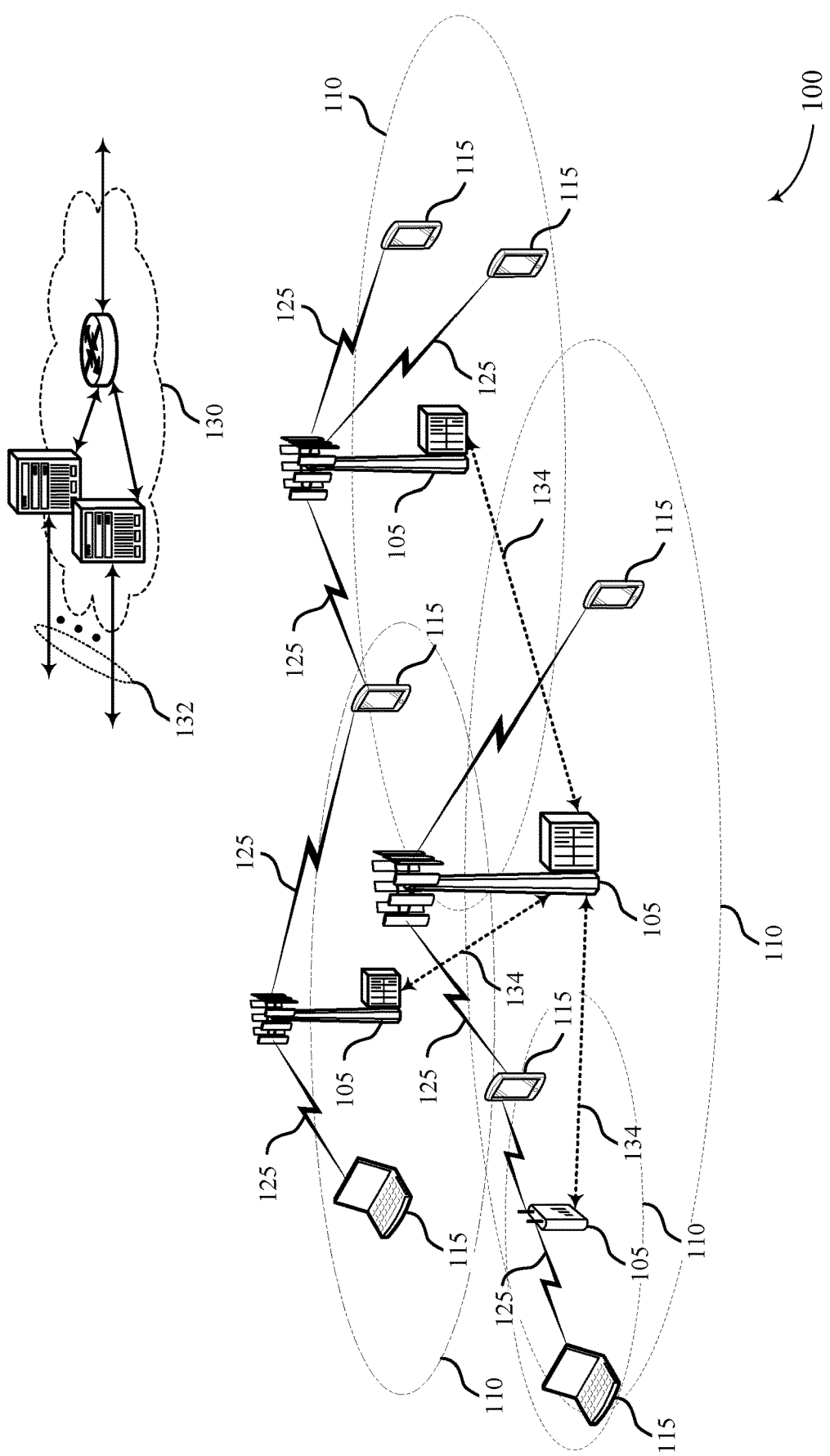
FIGS. 1 through 3 illustrate examples of wireless communications systems that support a preemptive indication of inter-RAT mobility in accordance with aspects of the present disclosure.

Some wireless communications systems may comprise aspects of multiple generations of networks, including generations utilizing different radio access technologies (RATs), and various aspects of the different generations of networks may or may not be interconnected in some fashion. For example, a system may comprise a fourth generation (4G) network, which may utilize a Long-Term Evolution (LTE) RAT, as well as a fifth generation (5G) network, which may utilize a New Radio (NR) RAT. The core network of the 4G network may or may not be communicatively linked with the core network of the 5G network.

Depending on whether and how the core networks of the two generations of networks are communicatively linked, a connected-mode inter-RAT handover procedure—e.g., an inter-RAT handover procedure in which a radio-connected state is maintained—may or may not be supported by the system. In some cases, a system may support the connected-mode inter-RAT handover procedure in some geographic locations but not others. Where the system does not support the connected-mode inter-RAT handover procedure, a user equipment (UE) may initiate an alternative inter-RAT mobility procedure that includes a release of radio connection—e.g., a radio connection release procedure according to a first RAT, followed by an initial attach or registration procedure according to a second RAT. By receiving, in advance, an indication of inter-RAT connected-mode mobility between the first RAT and the second RAT, the UE may determine which procedure is appropriate for transitioning from one RAT to another in a given location and thus avoid a trial-and-error approach, which may reduce latency.

An indication of inter-RAT connected-mode mobility between the first RAT and the second RAT may comprise a list of geographic areas in which the UE is to initiate an inter-RAT mobility procedure. In some examples, the indication may comprise, as an alternative or in addition, a list of geographic areas in which a system does or does not support a connected-mode inter-RAT handover procedure.

Availability of the connected-mode inter-RAT handover procedure in a given geographic area may depend at least in part on the availability of an inter-RAT handover interface, and the indication may, as an alternative or in addition, comprise a list of geographic areas in which the inter-RAT handover interface is or is not present. The inter-RAT handover interface may be an interface between a core network node of a first generation network and a core network node of a second generation network—e.g., an interface between a 4G core network node and a 5G core network node. The system may support the connected-mode inter-RAT handover procedure where the inter-RAT handover interface is present, and the system may not support the connected-mode inter-RAT handover procedure where the inter-RAT handover interface is not present.

The UE may receive the indication of inter-RAT connected-mode mobility upon performing an initial attach or registration procedure using a first RAT or upon performing a location update procedure in accord with the first RAT. For example, the UE may receive the indication in conjunction with a random access process, such as an LTE Initial Attach or an NR Initial Registration, or in conjunction with a location update process, such as an LTE Tracking Area Update (TAU) procedure or an NR Normal (or Periodic) Registration procedure. In some such cases, the UE may receive the indication as part of an Attach Accept, a TAU Accept, or a Registration Accept message. The UE may receive the indication from a core network node corresponding to the first RAT, via, in some cases, a non-access stratum (NAS) protocol layer.

Aspects of the disclosure are initially described in the context of a wireless communications system. Further examples are then provided that illustrate preemptive indication of inter-RAT mobility and related process flows. Aspects of the disclosure are further illustrated by and described with reference to apparatus diagrams, system diagrams, and flowcharts that relate to a preemptive indication of inter-RAT mobility.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or an NR network. In some cases, wireless communications system may include aspects of different generations of networks, such as aspects of both a 4G network and a 5G network. For example, some base stations 105 may be 4G base stations that utilize an LTE RAT and other base stations 105 may be 5G base stations that utilize an NR RAT. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130). Base stations 105 may collectively comprise or be included in a radio access network (RAN) and be configured to provide communication between UEs 115 and the core network 130. Additionally, while only a single instance of a core network 130 is illustrated, multiple core networks 130 may be present. Further, the core networks 130 may comprise different generations of core networks and correspond to different generations of corresponding RANs that utilize different RATs. The core networks 130 may communicate with each other, and may or may not include an interface between each other to facilitate connected-mode handover procedures by which UEs 115 may transition from one RAT to another.

The core networks 130 may provide user authentication, access authorization, tracking, Internet Protocol (IP) connectivity, and other access, routing, or mobility functions.

One core network 130 may be an evolved packet core (EPC), which may include at least one mobility management entity (MME), at least one serving gateway (SGW), and at least one Packet Data Network (PDN) gateway (PGW). The MME may manage NAS (e.g., control plane) functions such as mobility, authentication, and bearer management for UEs 115 served by base stations 105 associated with the EPC. User IP packets may be transferred through the SGW, which itself may be connected to the PGW. The PGW may provide IP address allocation as well as other functions. The PGW may be connected to the network operators IP services. The operators IP services may include access to the Internet, Intranet(s), an IP Multimedia Subsystem (IMS), or a Packet-Switched (PS) Streaming Service.

Another core network 130 may be a 5G core (5GC), which may include at least one core access and mobility management entity (e.g., Access and Mobility Management Function (AMF)), at least one control plane management entity (e.g., Session Management Function (SMF)), and at least one user plane management entity (e.g., (User Plane Function (UPF)). An AMF may provide mobility management functionalities for a 5G network be similar to those provided by an MME for a 4G network, and an SMF and an UPF may collectively provide control plane and user plane provide functionalities for the 5G network similar to those provided by an SGW and a PGW for a 4G network.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

Different RANs may implement different RATs. For example, a 4G RAN may be known as an evolved universal terrestrial radio access network (EUTRAN) and may implement an LTE-based RAT. As another example, a 5G RAN may implement an NR RAT. The organizational structure of the carriers may be different for different RATs (e.g., LTE, LTE-A, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
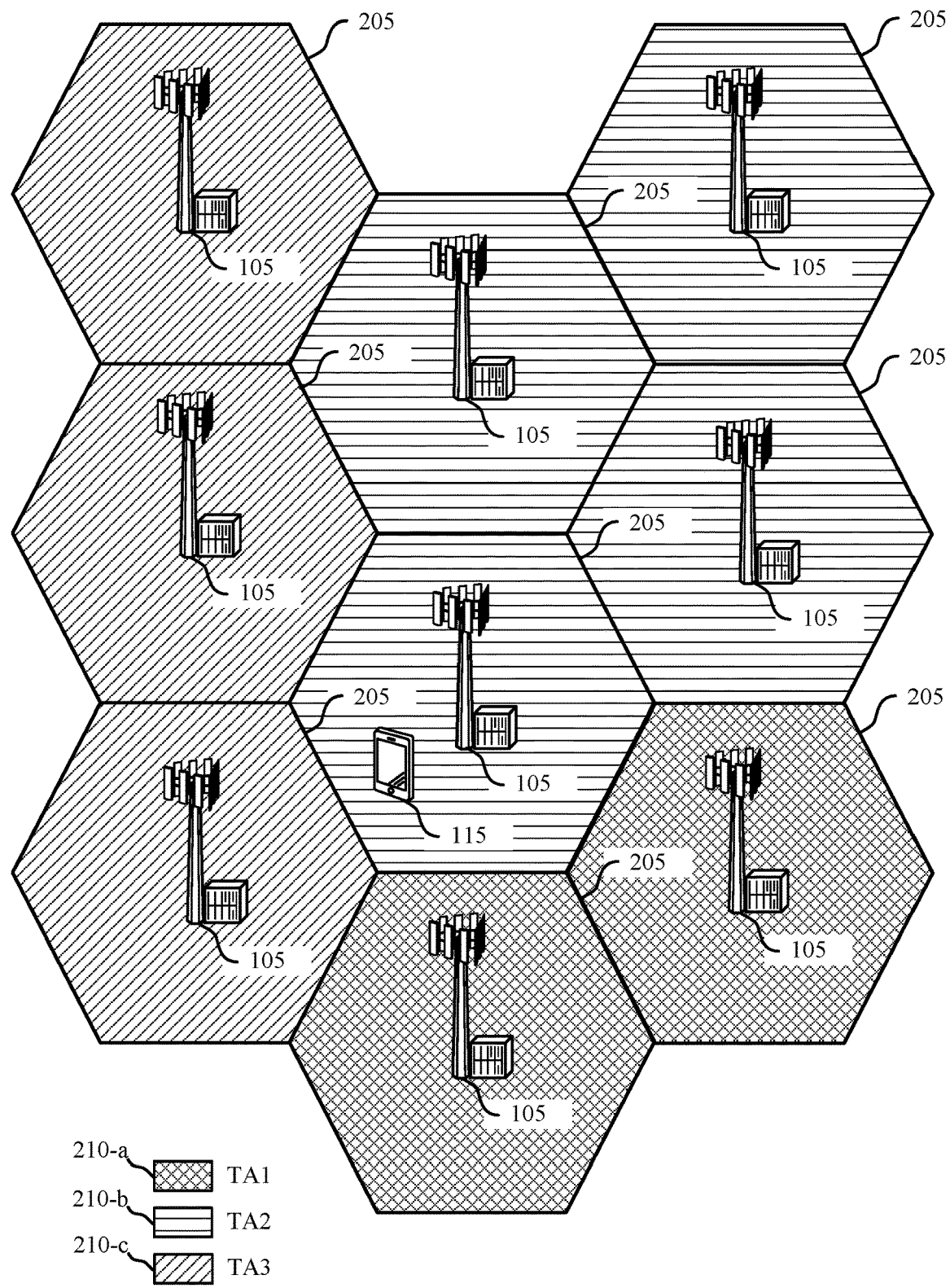

FIG. 2 illustrates another example of a wireless communications system 200 that supports preemptive indication of inter-RAT mobility in accordance with various aspects of the present disclosure. In some examples, wireless communications system 200 comprise aspects of wireless communications system 100.

Wireless communications system 200 may be an example of a 4G network implementing an LTE RAT, or a 5G network implementing an NR RAT. Wireless communications system 200 comprises a number of base stations 105, which may be eNBs or gNBs. In the example of wireless communications system 200, each base station 105 serves one cell 205, but that should not be construed as limiting—other relationships between the number of base stations 105 and the number of cells 205 are possible, as explained above. Groups of one or more cells 205 may be defined as tracking areas (TAs) 210. For example, in wireless communications system 200, TA1 (210-*a*) comprises two cells, TA2 (210-*b*) comprises four cells, and TA3 (210-*c*) comprises three cells.

An operator of a wireless communications system, such as wireless communications systems 100, 200, may define TAs 210 in order to aid with mobility management as a UE moves from cell 205 to cell 205. In some cases, the operator may define TAs 210 as part of an initial deployment of the wireless communications system 200. TAs 210 may aid with mobility management, for example, by reducing the amount of signaling and thus the amount of device and system resources utilized for mobility management. When a UE is in an active state, a core network node included within wireless communications system 200—e.g., an MME or an AMF—may know the location of the UE at a cell 205 level of granularity—e.g., the core network node may know which cell 205 the UE is in. When the UE is in an idle state, however, the core network node may know the location of the UE at only a TA 210 level of granularity—e.g., the core network node may know which TA 210 UE 115 is in but may not know the particular cell 205 within the TA 210 in which the UE 115 is located. This may allow the UE 115-*a* to move from one cell 205 to another 205 without notifying the core network node unless it enters a new TA 210. When paging an idle UE 115, the wireless communications system 200 may perform the page on a TA-wide basis.

Each TA 210 may be identified by a TA Identifier (TAI). Each TAI may comprise a public land mobile network (PLMN) identifier and a TA Code (TAC). A PLMN identifier may further comprise a combination of a mobile country code (MCC), which may be a unique code assigned on a per-country basis, and a mobile network code (MNC), which may be a unique code assigned on a per-operator basis. A TAC may comprise a unique code that a network operator has assigned to each TA. Thus, a TAI may comprise a combination of an MCC, MNC, and TAC, with the TAC chosen by the network operator.

When a UE 115 attaches to wireless communications system 200, the UE 115 may receive a TAI list from a core network node, which may comprise a list of TAs 210—with each TA 210 in the list identified by a corresponding TAI—in which the UE 115 may travel without updating the core network node as to the location of the UE 115. For example, in the context of wireless communications systems 200, UE 115 may receive a TA list that comprises only TA2 (210-*b*) and TA3 (210-*c*), which may indicate that UE 115 may travel within TA2 (210-*b*) and TA3 (210-*c*) without updating its location with the core network node, but that UE 115 must update its location with the core network node if it enters a TA 210 not included in the received TA list, such as TA1 (210-*a*). The UE 115 may also receive a TAI list from the core network node as part of a location update procedure. A TA list may in some cases be referred to as a Registration Area or a REG area.

A UE 115 may update its location with one or more core network nodes in a variety of circumstances, including either periodically or whenever UE 115 enters a TA 210 not included in a currently-operable TA list. To update its location with a core network node, the UE 115 may use a TAU. As part of a TAU procedure, the UE 115 may send to the core network node a TAU Request message. The core network node may process the TAU Request message (e.g., authenticate UE 115 and update NAS security) and then send to the UE 115 a TAU Accept message. The core network node may send the TAU Accept message to the UE 115 via a NAS layer and protocol. As part of the TAU Accept message, the core network node may send to the UE 115 a new TA list and also may send to UE 115 a new globally unique temporary identity (GUTI).

Mobility management techniques in accord with those described in the context of wireless communications system 200 may be utilized in any generation of network, including 4G and 5G networks. Similarly, mobility management procedures, including location update procedures similar to TAUs, may be utilized in any generation of network and may be known by other names. For example, in a 5G network, a location update procedure similar to a TAU may be known as a Periodic Registration or Normal Registration (as opposed to an Initial Registration, which may be similar to an Initial Attach in an LTE network).

Figure 3:
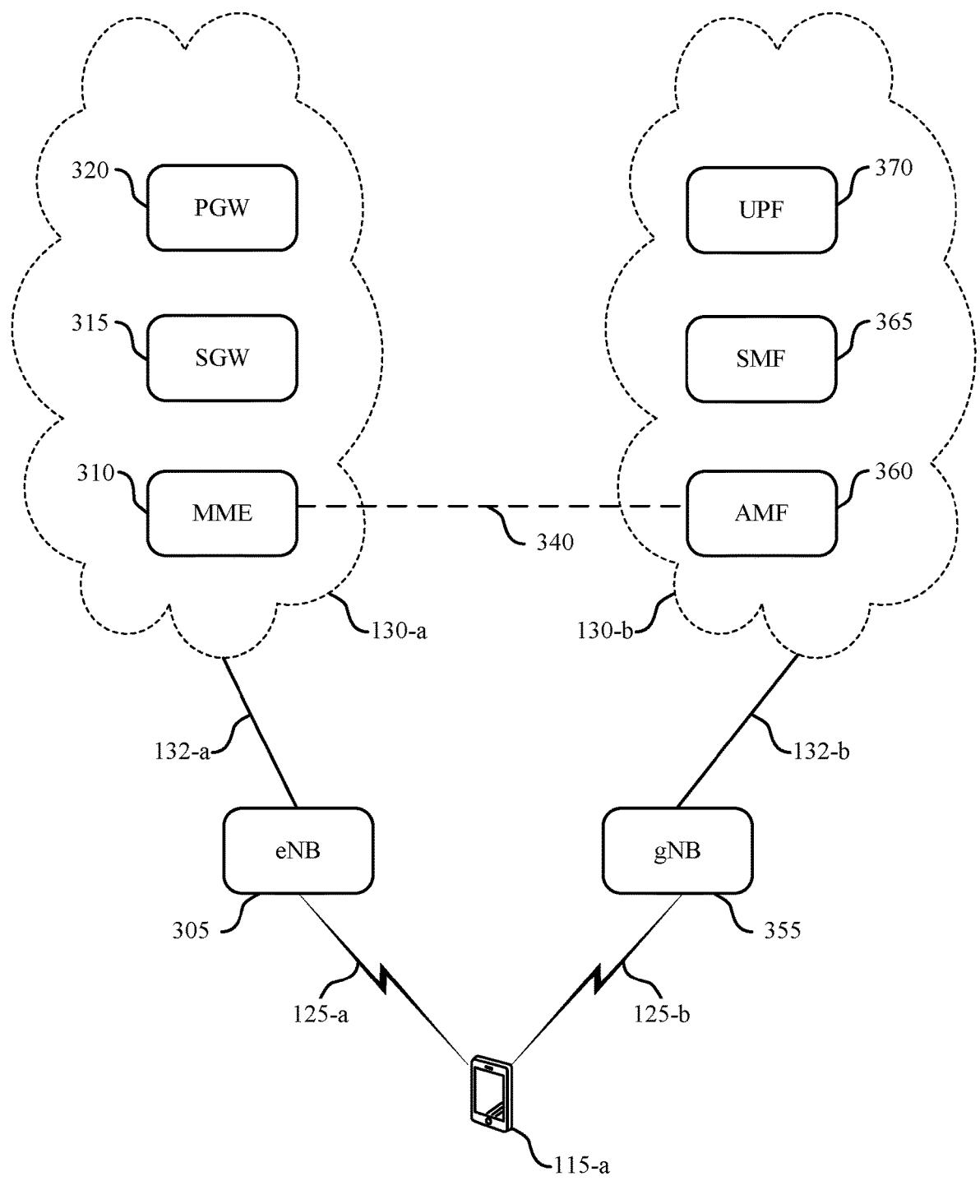

FIG. 3 illustrates another example of a wireless communications system 300 that supports a preemptive indication of inter-RAT mobility in accordance with various aspects of the present disclosure. In some examples, wireless communications system 300 may be implemented by aspects of wireless communications system 100. Wireless communications system 300 comprises aspects of a 4G network as well as aspects of a 5G network.

In wireless communications system 300, the 4G network aspects comprise a 4G core network 130-*a* and eNB 305, which is part of an associated EUTRAN. 4G core network 130-*a* may be an example of an EPC and may comprise MME 310, SGW 315, and PGW 320. MME 310 may be an MME as described above in reference to wireless communications system 100 and may provide mobility management functions for the 4G network. SGW 315 may be an SGW such as described above in reference to wireless communications system 100. PGW 320 may be a PGW as described above in reference to wireless communications system 100. Nodes within 4G core network 130-*a* may be interconnected by one or more core network interfaces.

eNB 305 may be an example of a base station 105 as described above in reference to wireless communications system 100 and may implement an LTE RAT. eNB 305 may communicate with 4G core network 130-*a* via one or more backhaul links 132-*a*, and eNB 305 may at times utilize the LTE RAT to communicate with a UE 115-*a* via one or more air interface communication links 125-*a*.

In wireless communications system 300, the 5G network aspects comprise 5G core network 130-*b* and gNB 355, which is part of an associated 5G RAN. 5G core network 130-*b* may an example of a 5GC and may comprise AMF 360, SMF 365, and UPF 370. AMF 360 may be an AMF as described above in reference to wireless communications system 100 and may provide mobility management functionalities for the 5G network similar to those provided by MME 310 for the 4G network. Collectively, SMF 365 and UPF 370 may be an SMF and a UPF as described above in reference to wireless communications system 100 and may provide control plane and user plane provide functionalities for the 5G network similar to those provided by SGW 315 and PGW 320 for the 4G network.

gNB 355 may be an example of a base station 105 as described above in reference to wireless communications system 100 and may implement an NR RAT. gNB 355 may communicate with 5G core network 130-*b* via one or more backhaul links 132-*b*, and gNB 355 may at times utilize the NR RAT to communicate with the UE 115-*a* via one or more air interface communication links 125-*b*.

Wireless communications system 300 may also comprise an interface 340, which may be referred to as an N26 interface. N26 interface 340 may only be present between 4G core network 130-*a* and 5G core network 130-*b* in some locations covered by wireless communications system 300. For example, N26 interface 340 may exist in some geographic areas (e.g., some TAs) but not others (e.g., other TAs).

Whether N26 interface 340 exists in a given geographic area may depend, for example, on whether a network operator has chosen to implement an N26 interface 340 in that geographic area. In a geographic area in which an N26 interface 340 is present, the N26 interface 340 may comprise an interface between core network nodes that provide mobility management functionalities for that geographic area—e.g., between an MME 310 providing 4G mobility management functionalities and an AMF 360 providing 5G mobility management functionalities. In some cases, MME 310 and AMF 360 may be physically collocated and share one or more hardware resources.

Where available, N26 interface 340 may comprise an inter-RAT handover interface, such as an inter-generation handover interface, and support a connected-mode inter-RAT handover procedure. The connected-mode inter-RAT handover procedure may comprise a handover procedure in which a UE 115, such as UE 115-*a*, transitions from accessing wireless communications system 300 via LTE to accessing wireless communications system 300 via NR, or vice versa, while maintaining an RRC connected state during the transition. In the examples that follow, the N26 interface 340 is used to facilitate a connected-mode inter-RAT handover procedure from a 4G RAT to a 5G RAT, and from a 5G RAT to a 4G RAT.

In some cases, when UE 115-*a* transitions from accessing wireless communications system 300 via LTE (e.g., via eNB 305) to accessing wireless communications system 300 via NR (e.g., via gNB 355), the connected-mode inter-RAT handover procedure may comprise a number of steps: MME 310 may receive, as a result of one or more requests sent to UE 115-*a*, information regarding signal quality between UE 115-*a* and a number of base stations 105, including eNB 305 as well as other base stations 105 near UE 115-*a*. MME 310 may determine that another base station 105 is better situated or equipped than is eNB 305 to communicate with the UE 115-*a*, based at least in part on the signal quality measurements received by MME 310 or, in the alternative or in addition, based at least in part on scheduling factors and other network-side considerations. MME 310 and AMF 360 may exchange one or more messages in order to prepare AMF 360 for the connected-mode inter-RAT handover. For example, MME 310 may provide to AMF 360 information regarding UE 115-*a* and its current RRC connected session (e.g., UE 115-*a*'s location or what network services UE 115-*a* is accessing). AMF 360 may then exchange one or more messages with base stations included in the 5G RAN in order to prepare a target gNB, such as gNB 355, with which UE 115-*a* will communicate as a result of the connected-mode inter-RAT handover. For example, AMF 360 may send a request to gNB 355 that gNB 355 accept UE 115-*a* and receive a response from gNB 355 indicating whether gNB 355 will accept UE 115-*a*. AMF 360 may also send to gNB 355 information regarding UE 115-*a* and its current RRC connected session, which gNB 355 may use to determine whether to accept UE 115-*a* and to prepare to receive UE 115-*a* (e.g., gNB 355 may use the information regarding UE 115-*a* and UE 115-*a*'s current RRC connected session to establish one or more resources for UE 115-*a* to use). gNB 355 may send to AMF 360 information regarding resources that UE 115-*a* is to use following the connected-mode inter-RAT handover, and AMF 360 may communicate such information to MME 310. MME 310 may send to eNB 305 a 4G-to-5G handover command, along with information regarding 5G resources that UE 115-*a* is to use to communicate with gNB 355. eNB 305 may then send to UE 115-*a* connected-mode inter-RAT handover command, which may include information regarding resources that UE 115-*a* is to use to communicate with gNB 355. UE 115-*a* may then send a connected-mode inter-RAT handover complete message to gNB 355. UE 115-*a* may then exchange one or more messages with AMF 360 in order to execute a Normal Registration procedure.

In some cases, when UE 115-*a* transitions from accessing wireless communications system 300 via NR (e.g., via gNB 355) to accessing wireless communications system 300 via LTE (e.g., via eNB 305), the connected-mode inter-RAT handover procedure may comprise a number of steps: AMF 360 may receive, as a result of one or more requests sent to UE 115-*a*, information regarding signal quality between UE 115-*a* and a number of base stations 105, including gNB 355 as well as other base stations 105 near UE 115-*a*. AMF 360 may determine that another base station 105 is better situated or equipped than gNB 355 to communicate with the UE 115-*a*, based at least in part on the signal quality measurements received by AMF 360 or, in the alternative or in addition, based at least in part on scheduling factors and other network-side considerations. AMF 360 and MME 310 may exchange one or more messages in order to prepare MME 310 for the connected-mode inter-RAT handover. For example, AMF 360 may provide to MME 310 information regarding UE 115-*a* and its current RRC connected session (e.g., UE 115-*a*'s location or what network services UE 115-*a* is accessing). MME 310 may then exchange one or more messages with base stations included in the EUTRAN in order to prepare a target eNB, such as eNB 305, with which UE 115-*a* will communicate as a result of the connected-mode inter-RAT handover. For example, MME 310 may send a request to eNB 305 that eNB 305 accept UE 115-*a* and receive response from eNB 305 indicating whether eNB 305 will accept UE 115-*a*. MME 310 may also send to eNB 305 information regarding UE 115-*a* and its current RRC connected session, which eNB 305 may use to determine whether to accept UE 115-*a* and to prepare to receive UE 115-*a* (e.g., eNB 305 may use the information regarding UE 115-*a* and UE 115-*a*'s current RRC connected session to establish one or more resources for UE 115-*a* to use). eNB 305 may send to MME 310 information regarding resources that UE 115-*a* is to use following the connected-mode inter-RAT handover, and MME 310 may communicate such information to AMF 360. AMF 360 may send to gNB 355 a 5G-to-4G handover command, along with information regarding 4G resources that UE 115-*a* is to use to communicate with eNB 305. gNB 355 may then send to UE 115-*a* connected-mode inter-RAT handover command, which may include information regarding resources that UE 115-*a* is to use to communicate with eNB 305. UE 115-*a* may then send a connected-mode inter-RAT handover complete message to eNB 305. UE 115-*a* may then exchange one or more messages with MME 310 in order to execute a TAU procedure.

Thus, as part of a connected-mode inter-RAT handover, one or more of UE 115-*a*, the target base station 105, and a mobility management node for the target network (e.g., a target MME 310 or AMF 360) may receive or provide information regarding resources that UE 115-*a* is using to communicate with the prior RAT and resources that UE 115-*a* is to use to communicate with the subsequent RAT. For example, when UE 115-*a* transitions from accessing wireless communications system via one RAT to accessing wireless communications system 300 via another RAT using the connected-mode inter-RAT handover procedure, wireless communications system 300 may not re-authenticate UE 115-*a* or assign UE 115-*a* new IP address. Further, UE 115-*a* may maintain an RRC connected state during the connected-mode inter-RAT handover, and the connected-mode inter-RAT handover may be referred to as an example of a seamless handover procedure.

UE 115-*a* may sometimes enter a geographic area (e.g., TA 210), however, in which a connected-mode inter-RAT handover procedure is not supported. For example, UE 115-*a* may sometimes enter a TA 210 in which no N26 interface 340 is available, which may be referred to as an N26 interface hole. If UE 115-*a* enters an N26 interface hole, UE 115-*a* may attempt but fail to execute a TAU procedure, a Normal Registration procedure, or a connected-mode inter-RAT handover procedure, and these attempts may introduce latency into process by which UE 115-*a* transitions to a different RAT in the new geographic area.

Figure 4:
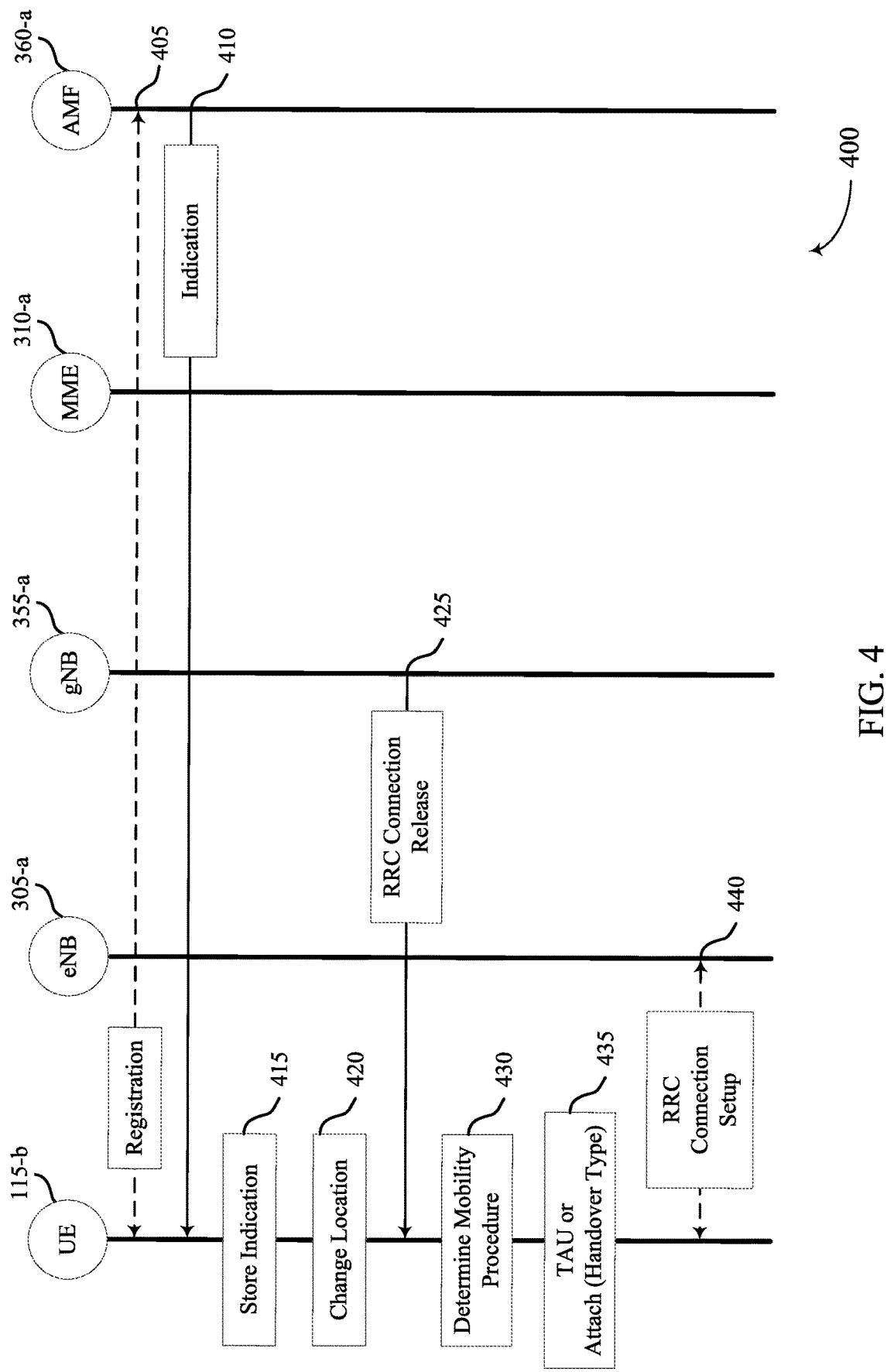
FIGS. 4 and 5 illustrate examples of process flows that supports a preemptive indication of inter-RAT mobility in accordance with aspects of the present disclosure.

FIG. 4 illustrates an example of a process flow 400 that supports preemptive indication of inter-RAT mobility in accordance with various aspects of the present disclosure. In some examples, process flow 400 may be implemented by aspects of wireless communications systems 100, 200, or 300. Process flow 400 may include a UE 115-*b*, an eNB 305-*a*, a gNB 355-*a*, an MME 310-*a*, and an AMF 360-*a*.

UE 115-*b* and AMF 360-*a* may exchange one or more messages as part of a Registration 405 by which UE 115-*b* registers with AMF 360-*a* via an NR RAT. Registration 405 may comprise an Initial Registration, which may occur, for example, through a random access procedure. Registration 405 may also comprise a Normal Registration, which may occur periodically or as part of a location update procedure. Registration 405 may also comprise a connected mode intra-RAT handover procedure. UE 115-*b* and AMF 360-*a* may exchange the one or more messages included in Registration 405 at a NAS layer using a NAS protocol.

AMF 360-*a* may transmit to UE 115 an indication 410. AMF 360-*a* may transmit the indication 410 at a NAS layer using a NAS protocol. AMF 360-*a* may transmit the indication 410 in conjunction with a Registration procedure (ether an Initial Registration or a Normal Registration) or a connected-mode intra-RAT handover. For example, AMF 360-*a* may transmit the indication 410 as part of a Registration Accept message, or in conjunction with the Registration Accept message.

The indication 410 may comprise an indication of inter-RAT connected-mode mobility between NR and LTE. The indication 410 may comprise a list of one or more geographic areas in which UE 115-*b* is to initiate an inter-RAT mobility procedure from NR to LTE with an attach of handover type. In some cases, the indication 410 may comprise an additional list of one or more geographic areas in which an inter-RAT handover interface (e.g., N26 interface 340) is available and therefore a TAU procedure can be used. In some cases, it may be implicit in the indication 410 that any geographic area not listed as one in which UE 115-*b* is to initiate an inter-RAT mobility procedure without N26 interface from NR to LTE is a geographic area in which an inter-RAT handover interface (e.g., N26 interface 340) is available.

As another example, in some cases, the indication 410 may comprise a list of one or more geographic areas in which an inter-RAT handover interface (e.g., N26 interface 340) is not available. It may be implicit in the indication 410 that any geographic area listed as one in which an inter-RAT handover interface (e.g., N26 interface 340) is not available 410 is a geographic area in which UE 115-*b* is to initiate an inter-RAT mobility procedure from NR to LTE with an attach of handover type.

The inter-RAT handover interface may comprise an N26 interface 340. The geographic areas may comprise TAs 210, and any list of one or more geographic areas may comprise a TA list and may identify geographic areas using TAIs. Other geographic areas, such as cells, are possible, and other identifiers, such as cell or base station 105 identifiers are also possible.

At block 415, UE 115-*b* may store the indication 410. At some later time, at block 420, UE 115-*b* may change geographic location, which may involve a transition to LTE. gNB 355-*a* may release 425 the RRC connection of UE 115-*b*, as a result of a location change at block 420 or a command by AMF 360-*a*. As a result of release 425, UE 115-*b* may change from an RRC connected state to an RRC idle, or disconnected, state. Release 425 may include gNB 355-*a* sending an RRC connection release message to UE 115-*b*.

In some cases, a location change at block 420 may result in UE-115-*b* having entered a geographic location identified by the indication 410 as one in which UE-115-*b* is to initiate an inter-RAT mobility procedure. At block 430, UE 115-*b* may determine a mobility procedure to use in order to transition to LTE based at least in part on the indication 410 and based at least in part on having entered a geographic location identified by the indication 410. Having received the indication 410 preemptively—e.g., before a location change at block 420 or requiring a transition from NR to LTE—may reduce latency as UE 115-*b* may determine at block 430 a mobility procedure that is supported in the new geographic area.

In some cases, at block 430, UE 115-*b* may determine an inter-RAT mobility procedure and may initiate the inter-RAT mobility procedure at block 435. For example, if UE 115-*b* has entered a geographic area that the indication 410 either explicitly or implicitly identifies as one in which UE 115-*b* is to initiate an inter-RAT mobility procedure from NR to LTE with an attach of handover type (e.g., a geographic area in which an interface such as an N26 interface 340 is not available), UE 115-*b* may initiate the inter-RAT mobility procedure from NR to LTE with an attach of handover type. As another example, if UE 115-*b* has entered a geographic area that the indication 410 either explicitly or implicitly identifies as one in which UE 115-*b* is to initiate an inter-RAT mobility procedure from NR to LTE with a TAU procedure, (e.g., a geographic area in which an interface such as an N26 interface 340 is available), UE 115-*b* may initiate the inter-RAT mobility procedure from NR to LTE with a TAU procedure.

As part of the inter-RAT mobility procedure with an attach of handover type, UE 115-*b* and eNB 305-*a* may exchange one or more messages as part of an RRC connection setup 440 procedure, which may result in UE 115-*b* attaching to eNB 305-*a* using LTE. In some cases, RRC connection setup 440 procedure may comprise an LTE random access procedure, which may be referred to as an Attach. RRC connection setup 440 procedure may also include an authentication procedure, which may involve additional messages between UE 115-*b* and MME 310-*a*. In some cases, when UE 115-*b* transitions from NR to LTE using an inter-RAT mobility procedure with an attach of handover type, UE 115-*b* may maintain the same IP address throughout the inter-RAT mobility procedure, despite having entered an RRC idle state for some period of time.

Figure 5:
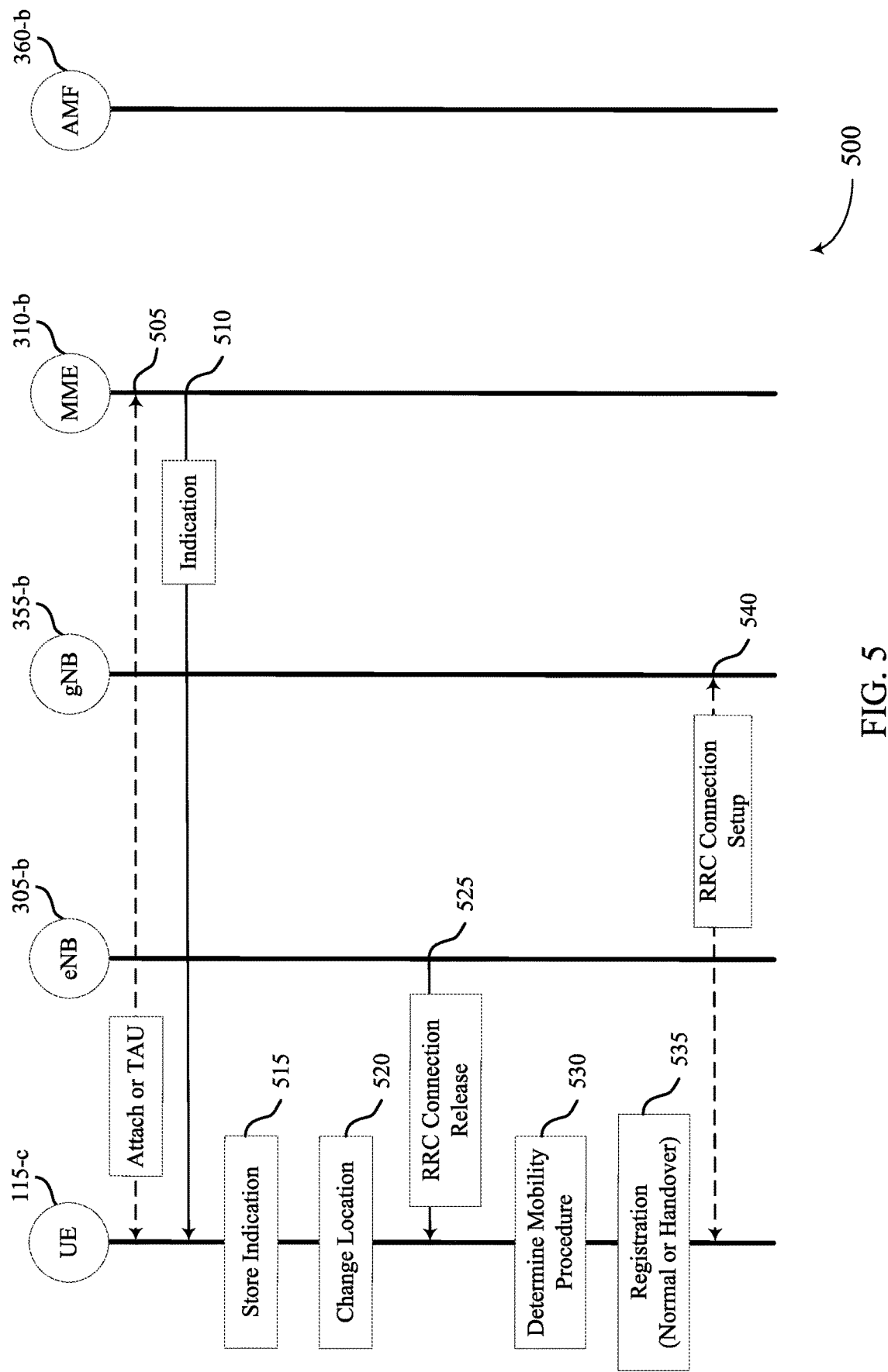

FIG. 5 illustrates an example of a process flow 500 that supports a preemptive indication of inter-RAT mobility in accordance with various aspects of the present disclosure. In some examples, process flow 500 may be implemented by aspects of wireless communications systems 100, 200, or 300. Process flow 500 may include a UE 115-*c*, an eNB 305-*b*, a gNB 355-*b*, an MME 310-*b*, and an AMF 360-*b*.

UE 115-*c* and eNB 305-*b* may exchange one or more messages as part of a procedure 505 by which UE 115-*c* attaches to or updates its location with MIME 310-*b* via an LTE RAT. Procedure 505 may comprise an Initial Attach, which may occur, for example, through a random access procedure. Procedure 505 may also comprise a TAU, which my occur periodically or as part of a location update procedure. Procedure 505 may also comprise a connected-mode intra-RAT handover procedure. UE 115-c and MME 310-b may exchange the one or more messages included in Registration 405 at a NAS layer using a NAS protocol MME 310-b may transmit to UE 115 an indication 510. MME 310-b may transmit the indication 510 at a NAS layer using a NAS protocol. MME 310-b may transmit the indication 510 in conjunction with an Initial Attach, TAU, or connected-mode intra-RAT handover procedure. For example, MME 310-b may transmit the indication 510 as part of a ATTACH or TAU Accept message, or in conjunction with the ATTACH or TAU Accept message.

The indication 510 may comprise an indication of inter-RAT connected-mode mobility between LTE and NR. The indication 510 may comprise a list of one or more geographic areas in which UE 115-c is to initiate an inter-RAT mobility procedure from LTE to NR with a registration of handover type. In some cases, the indication 510 may comprise an additional list of one or more geographic areas in which an inter-RAT handover interface (e.g., N26 interface 340) is available and therefore normal registration can be used. In some cases, it may be implicit in the indication 510 that any geographic area not listed as one in which UE 115-c is to initiate an inter-RAT mobility procedure from LTE to NR with a registration of handover type is a geographic area in which an inter-RAT handover interface (e.g., N26 interface 340) is available.

As another example, in some cases, the indication 510 may comprise a list of one or more geographic areas in which an inter-RAT handover interface (e.g., N26 interface 340) is not available. It may be implicit in the indication 510 that any geographic area listed as one in which an inter-RAT handover interface is not available 510 is a geographic area in which UE 115-c is to initiate an inter-RAT mobility procedure from LTE to NR with a registration of handover type.

The inter-RAT handover interface may comprise an N26 interface 340. The geographic areas may comprise TAs 210, and any list of one or more geographic areas may comprise a TA list (or a REG Area) and may identify geographic areas using TAIs (e.g., or using a REG Area). Other geographic areas, such as cells, are possible, and other identifiers, such as cell or base station 105 identifiers are also possible.

At block 515, UE 115-c may store the indication 510. At some later time, at block 520, UE 115-c may change geographic location, which may involve a transition to NR. eNB 305-b may release 525 the RRC connection of UE 115-c, as a result of a location change at block 520 or a command by MME 310-b. As a result of release 525, UE 115-c may change from an RRC connected state to an RRC idle, or disconnected, state. Release 525 may include eNB 305-b sending an RRC connection release message to UE 115-c.

In some cases, a location change at block 520 may result in UE-115-c having entered a geographic location identified by the indication 510 as one in which UE-115 is to initiate an inter-RAT mobility procedure with a registration of handover type. At block 530, UE 115-c may determine a mobility procedure to use in order to transition to NR based at least in part on the indication 510 and based at least in part on having entered a geographic location identified by the indication 510. Having received the indication 510 preemptively—e.g., before a location change at block 520 or requiring a transition from LTE to NR—may reduce latency as UE 115-c may determine at block 530 a handover procedure that is supported in the new geographic area.

In some cases, at block 530, UE 115-c may determine an inter-RAT mobility procedure and may initiate the inter-RAT mobility procedure at block 535. For example, if UE 115-c has entered a geographic area that the indication 510 either explicitly or implicitly identifies as one in which UE 115-c is to initiate an inter-RAT mobility procedure from LTE to NR with a registration of handover type, UE 115-c, may initiate the inter-RAT mobility procedure from LTE to NR with a registration of handover type. As another example, if UE 115-c has entered a geographic area that the indication 510 either explicitly or implicitly identifies as one in which UE 115-c is to initiate an inter-RAT mobility procedure from LTE to NR with a normal registration, UE 115-c, may initiate the inter-RAT mobility procedure from LTE to NR with a normal registration.

As part of the inter-RAT mobility procedure with a registration of handover type, UE 115-c and gNB 355-b may exchange one or more messages as part of an RRC connection setup 540 procedure, which may result in UE 115-c registering to gNB 355-b using NR. In some cases, RRC Connection Setup 540 procedure may comprise an NR random access procedure, which may be referred to as a Registration. RRC connection setup 540 procedure may also include an authentication procedure, which may involve additional messages between UE 115-c and AMF 360-b. In some cases, when UE 115-c transitions from LTE to NR using an inter-RAT mobility procedure with a registration of handover type, UE 115-c may maintain the same IP address throughout the inter-RAT mobility procedure, despite having entered an RRC idle state for some period of time.

Figure 6:
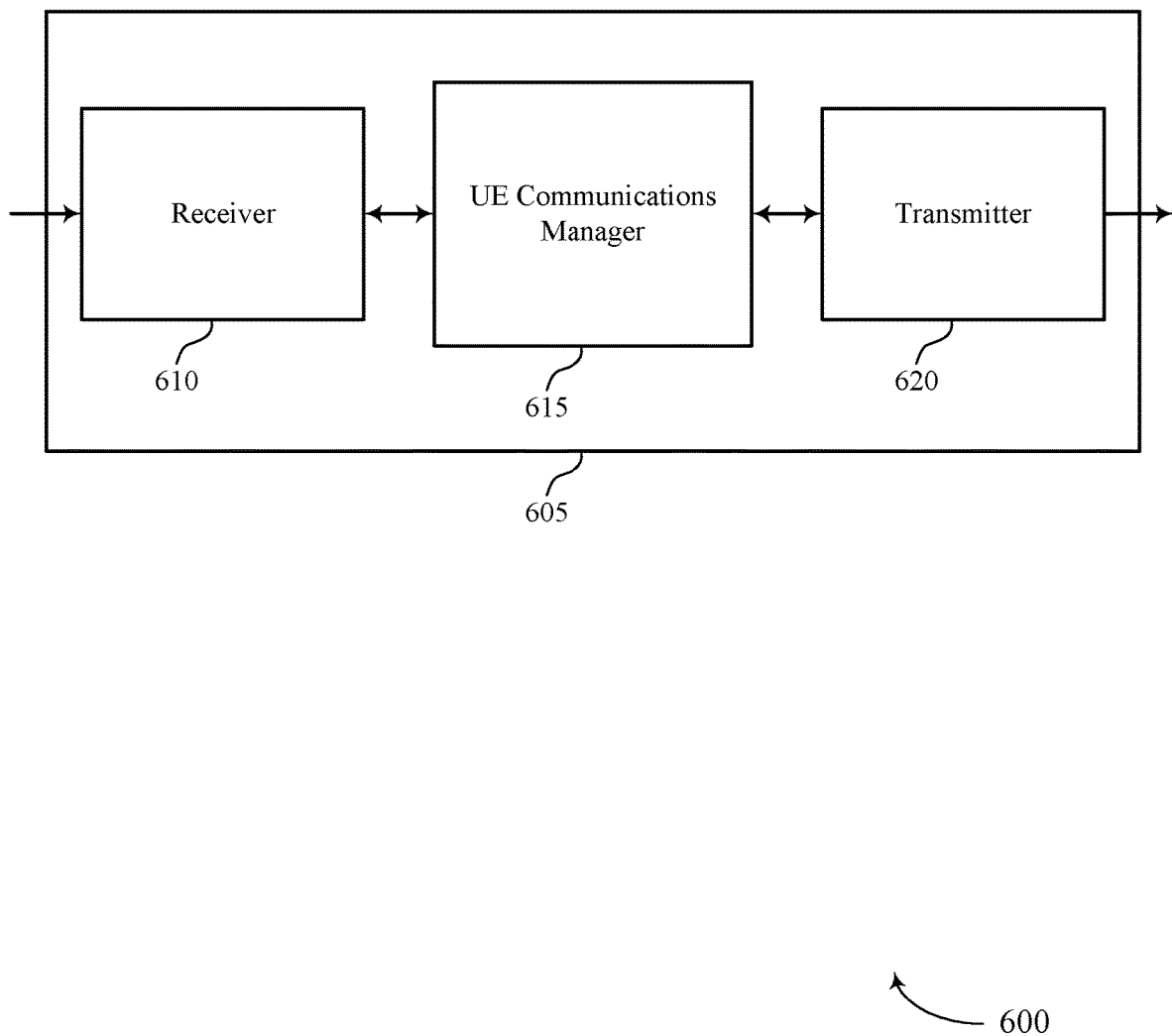
FIGS. 6 through 8 show block diagrams of a device that supports a preemptive indication of inter-RAT mobility in accordance with aspects of the present disclosure.

FIG. 6 shows a block diagram 600 of a wireless device 605 that supports a preemptive indication of inter-RAT mobility in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to a preemptive indication of inter-RAT mobility). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may attach, via a first RAT, to a first base station in a network. UE communications manager 615 may also receive, from a core network node of the network and for one or more geographic areas, an indication of inter-RAT connected-mode mobility between the first RAT and a second RAT, and determine whether to initiate an inter-RAT mobility procedure based on entering a geographic area identified by the indication subsequent to attaching to the first base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
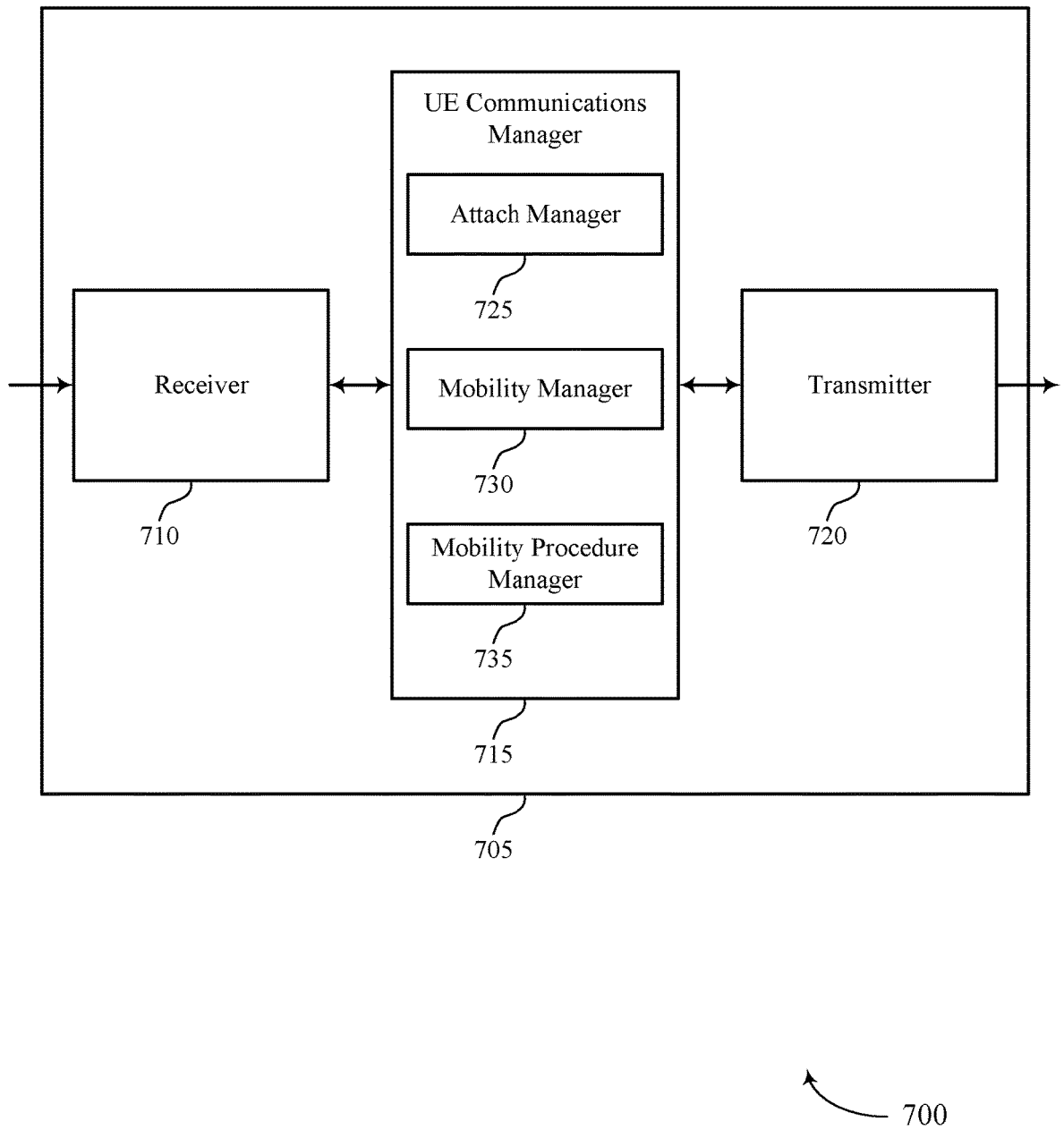

FIG. 7 shows a block diagram 700 of a wireless device 705 that supports a preemptive indication of inter-RAT mobility in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to a preemptive indication of inter-RAT mobility). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include attach manager 725, mobility manager 730, and mobility procedure manager 735.

Attach manager 725 may attach, via one or more RATs, to one or more base stations 105 in a network. In some cases, attach manager 725 may implement aspects of a random access procedure or a location update procedure.

Mobility manager 730 may receive, from a core network node of the network and for one or more geographic areas, an indication of inter-RAT connected-mode mobility between the first RAT and a second RAT. In some cases, receiving the indication of inter-RAT connected-mode mobility includes receiving a list of one or more geographic areas in which the UE is to initiate a mobility procedure to transition from the first RAT to the second RAT. In some examples, receiving the indication of inter-RAT connected-mode mobility further includes receiving an additional list of one or more geographic areas in which an inter-RAT handover interface is available. In some instances, receiving the indication of inter-RAT connected-mode mobility includes receiving the indication via a NAS layer. In some aspects, receiving the indication of inter-RAT connected-mode mobility includes receiving the indication in conjunction with a TAU. In some cases, receiving the indication of inter-RAT connected-mode mobility includes receiving the indication in conjunction with a registration procedure. In some examples, receiving the indication of inter-RAT connected-mode mobility includes receiving a list of one or more geographic areas in which an inter-RAT handover interface is not available. In some instances, the first RAT and the second RAT are different generation RATs. For example, in some cases, the first RAT is a LTE RAT and the second RAT is a 5G RAT, and in some cases, the first RAT is a 5G RAT and the second RAT is a LTE RAT.

Mobility procedure manager 735 may determine whether to initiate an inter-RAT mobility procedure based on entering a geographic area identified by the indication subsequent to attaching to a first base station. Mobility procedure manager 735 may also initiate the handover procedure based on the UE entering a geographic area identified by the indication.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
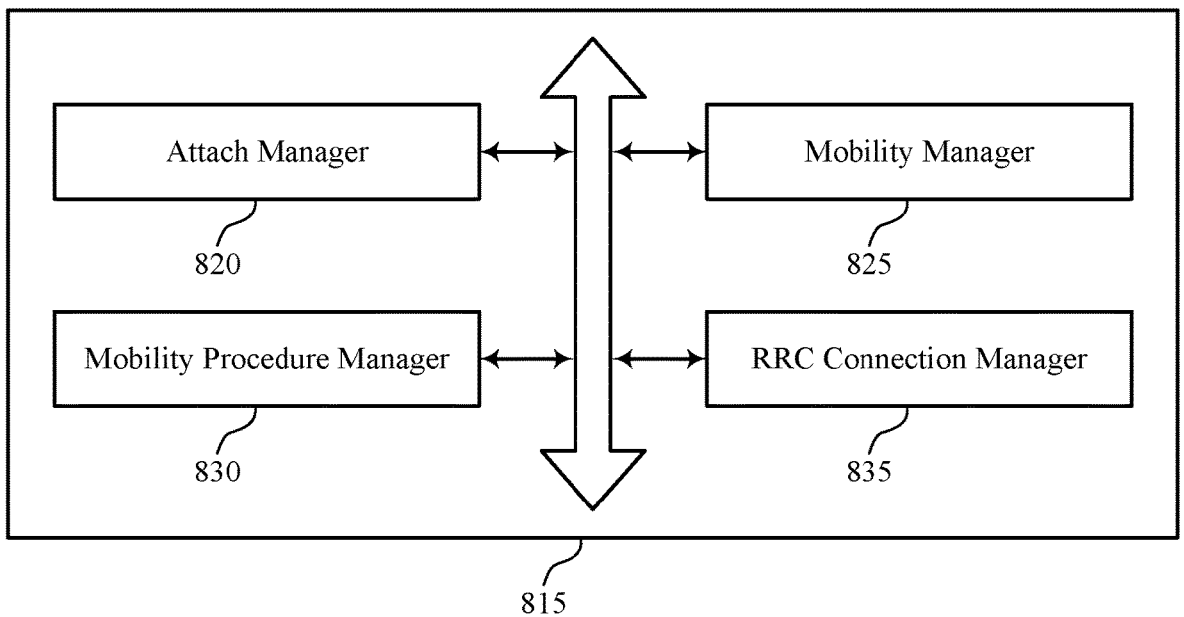

FIG. 8 shows a block diagram 800 of a UE communications manager 815 that supports a preemptive indication of inter-RAT mobility in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include attach manager 820, mobility manager 825, mobility procedure manager 830, and RRC connection manager 835. Each of these modules may communicate, directly or indirectly, with one another (e.g., via one or more buses).

Attach manager 820 may attach, via one or more RATs, to one or more base stations 105 in a network. In some cases, attach manager 820 may implement aspects of a random access procedure or a location update procedure.

Mobility manager 825 may receive, from a core network node of the network and for one or more geographic areas, an indication of inter-RAT connected-mode mobility between the first RAT and a second RAT. In some cases, receiving the indication of inter-RAT connected-mode mobility includes receiving a list of one or more geographic areas in which the UE is to initiate an inter-RAT mobility procedure to transition from the first RAT to the second RAT. In some examples, receiving the indication of inter-RAT connected-mode mobility further includes receiving an additional list of one or more geographic areas in which an inter-RAT handover interface is available. In some instances, receiving the indication of inter-RAT connected-mode mobility includes receiving the indication via a NAS layer. In some aspects, receiving the indication of inter-RAT connected-mode mobility includes receiving the indication in conjunction with a TAU. In some cases, receiving the indication of inter-RAT connected-mode mobility includes receiving the indication in conjunction with a registration procedure. In some examples, receiving the indication of inter-RAT connected-mode mobility includes receiving a list of one or more geographic areas in which an inter-RAT handover interface is not available. In some instances, the first RAT and the second RAT are different generation RATs. For example, in some cases, the first RAT is a LTE RAT and the second RAT is a 5G RAT, and in some cases, the first RAT is a 5G RAT and the second RAT is a LTE RAT.

Mobility procedure manager 830 may determine whether to initiate an inter-RAT mobility procedure based on entering a geographic area identified by the indication subsequent to attaching to a first base station and initiate the handover procedure based on the UE entering a geographic area identified by the indication.

RRC connection manager 835 may receive a RRC connection release message from a first base station and may execute aspects of an RRC connection setup procedure with a second base station.

Figure 9:
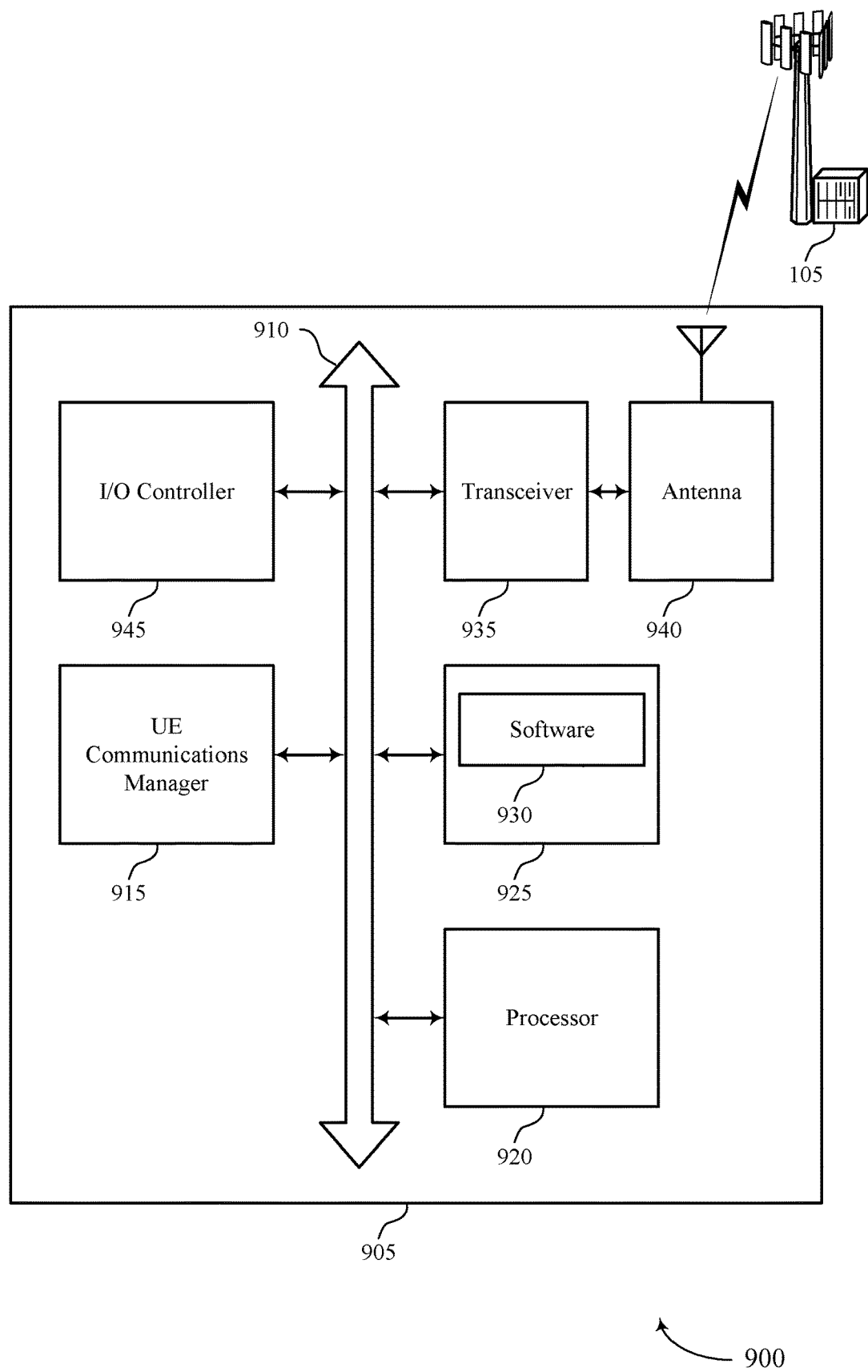
FIG. 9 illustrates a block diagram of a system including a user equipment (UE) that supports a preemptive indication of inter-RAT mobility in accordance with aspects of the present disclosure.

FIG. 9 shows a diagram of a system 900 including a device 905 that supports a preemptive indication of inter-RAT mobility in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting a preemptive indication of inter-RAT mobility).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support a preemptive indication of inter-RAT mobility. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
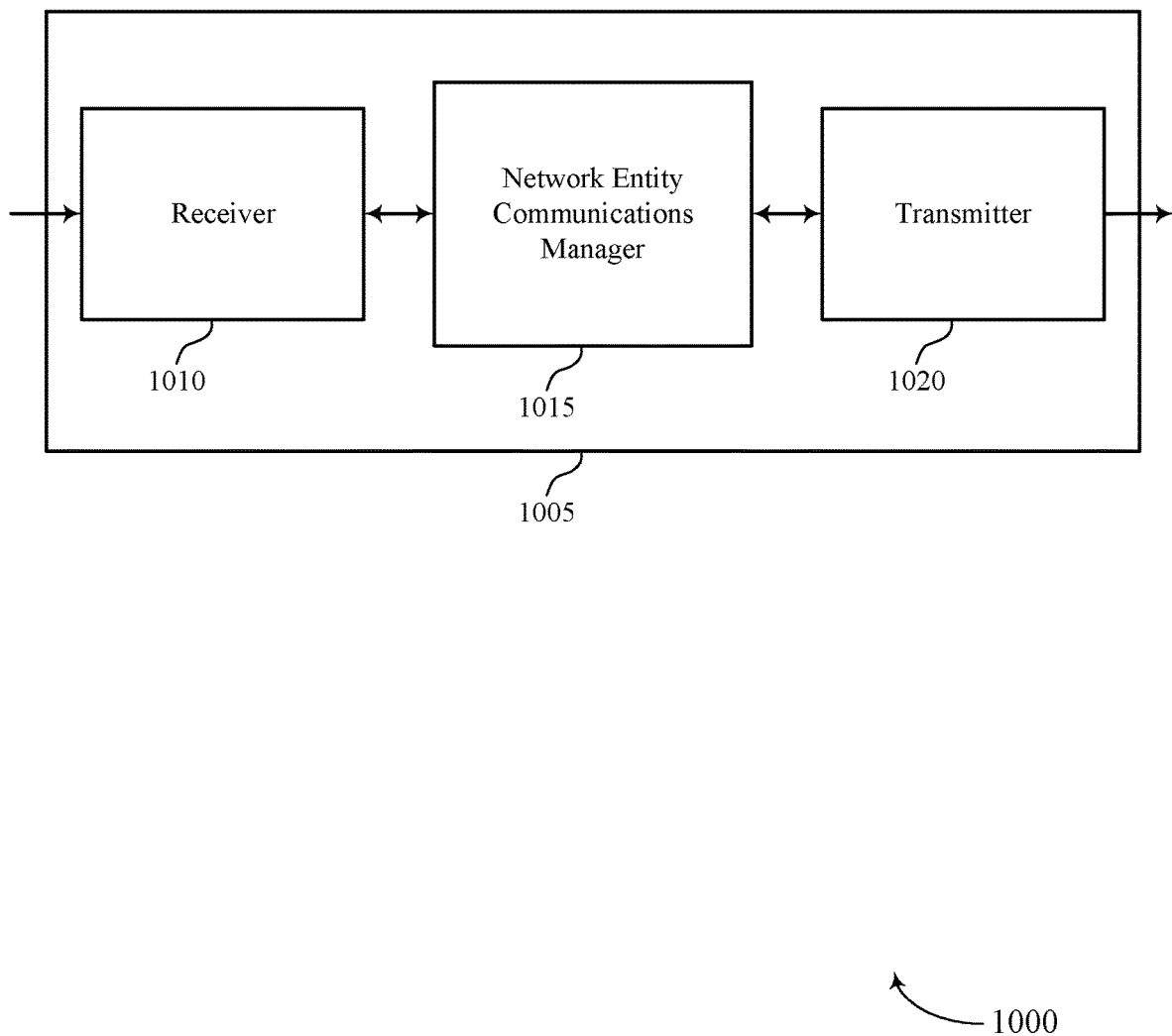
FIGS. 10 through 12 show block diagrams of a device that supports a preemptive indication of inter-RAT mobility in accordance with aspects of the present disclosure.

FIG. 10 shows a block diagram 1000 of a core network device 1005 that supports a preemptive indication of inter-RAT mobility in accordance with aspects of the present disclosure. Core network device 1005 may be an example of aspects of a core network 130 or mobility management entity (e.g., an MME 310 or AMF 360) as described herein. Core network device 1005 may include receiver 1010, network entity communications manager 1015, and transmitter 1020. Core network device 1005 may also include a processor. Each of these components may be in communication with one another (e.g., via one or more buses).

Receiver 1010 may receive information such as packets, user data, or control information associated with various information channels (e.g., control channels, data channels, and information related to a preemptive indication of inter-RAT mobility). Information may be passed on to other components of the device. The receiver 1010 may be an example of aspects of the transceiver 1335 described with reference to FIG. 13. The receiver 1010 may utilize one or more wired or wireless interfaces or antennas.

Network entity communications manager 1015 may be an example of aspects of the network entity communications manager 1315 described with reference to FIG. 13.

Network entity communications manager 1015 and/or at least some of its various sub-components may be implemented in hardware, software executed by a processor, firmware, or any combination thereof. If implemented in software executed by a processor, the functions of the network entity communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The network entity communications manager 1015 and/or at least some of its various sub-components may be physically located at various positions, including being distributed such that portions of functions are implemented at different physical locations by one or more physical devices. In some examples, network entity communications manager 1015 and/or at least some of its various sub-components may be a separate and distinct component in accordance with various aspects of the present disclosure. In other examples, network entity communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Network entity communications manager 1015 may receive, at the core network node, a request from a UE to attach, via a first RAT, to a first base station in the network and send, from the core network node to the UE and for one or more geographic areas, an indication of inter-RAT connected-mode mobility between the first RAT and a second RAT.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize one or more wired or wireless interfaces or antennas.

Figure 11:
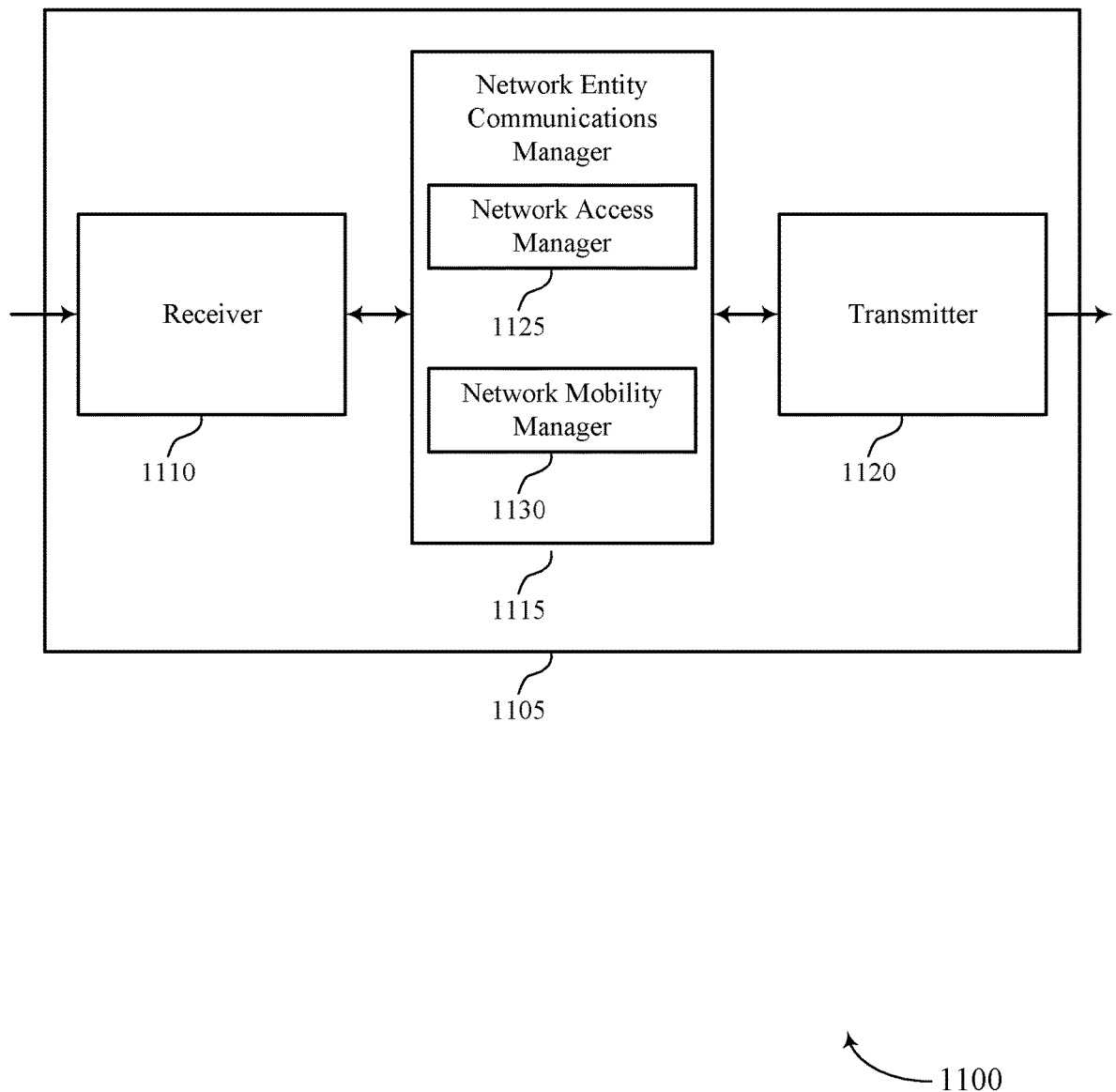

FIG. 11 shows a block diagram 1100 of a core network device 1105 that supports a preemptive indication of inter-RAT mobility in accordance with aspects of the present disclosure. Core network device 1105 may be an example of aspects of a core network device 1005 or a core network 130 or mobility management entity (e.g., an MME 310 or AMF 360) as described with reference to FIG. 10. Core network device 1105 may include receiver 1110, network entity communications manager 1115, and transmitter 1120. Core network device 1105 may also include a processor. Each of these components may be in communication with one another (e.g., via one or more buses).

Receiver 1110 may receive information such as packets, user data, or control information associated with various information channels (e.g., control channels, data channels, and information related to a preemptive indication of inter-RAT mobility). Information may be passed on to other components of the device. The receiver 1110 may be an example of aspects of the transceiver 1335 described with reference to FIG. 13. The receiver 1110 may utilize one or more wired or wireless interfaces or antennas.

Network entity communications manager 1115 may be an example of aspects of the network entity communications manager 1315 described with reference to FIG. 13.

Network entity communications manager 1115 may also include network access manager 1125 and network mobility manager 1130.

Network access manager 1125 may receive, at the core network node, a request from a UE to attach, via a first RAT, to a first base station in the network.

Network mobility manager 1130 may send, from the core network node to the UE and for one or more geographic areas, an indication of inter-RAT connected-mode mobility between the first RAT and a second RAT. In some cases, sending the indication of inter-RAT connected-mode mobility includes sending a list of one or more geographic areas in which the UE is to initiate an inter-RAT mobility procedure to transition from the first RAT to the second RAT. In some examples, sending the indication of inter-RAT connected-mode mobility includes sending an additional list of one or more geographic areas in which an inter-RAT handover interface is available. In some instances, sending the indication of inter-RAT connected-mode mobility includes sending the indication via a NAS layer. In some aspects, sending the indication of inter-RAT connected-mode mobility includes sending the indication in conjunction with a TAU. In some cases, sending the indication of inter-RAT connected-mode mobility includes sending the indication in conjunction with a registration procedure. In some examples, sending the indication of inter-RAT connected-mode mobility includes sending a list of one or more geographic areas in which an inter-RAT handover interface is not available. In some instances, the first RAT and the second RAT are different generation RATs. For example, in some cases, the first RAT is a LTE RAT and the second RAT is a 5G RAT, and in some cases, the first RAT is a 5G RAT and the second RAT is a LTE RAT.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize one or more wired or wireless interfaces or antennas.

Figure 12:
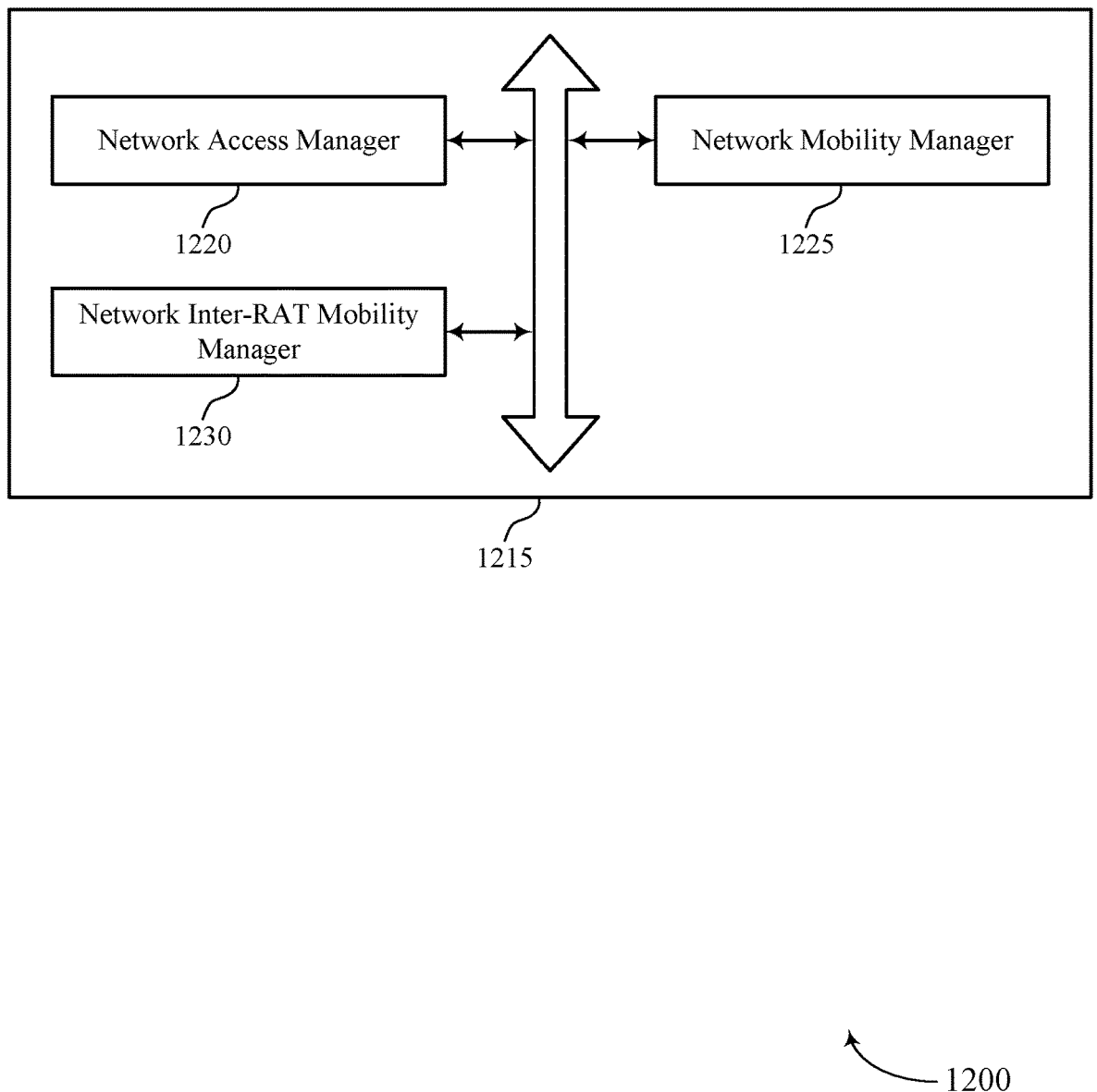

FIG. 12 shows a block diagram 1200 of a network entity communications manager 1215 that supports a preemptive indication of inter-RAT mobility in accordance with aspects of the present disclosure. The network entity communications manager 1215 may be an example of aspects of a network entity communications manager 1315 described with reference to FIGS. 10, 11, and 13. The network entity communications manager 1215 may include network access manager 1220, network mobility manager 1225, and network inter-RAT mobility manager 1230. Each of these modules may communicate, directly or indirectly, with one another (e.g., via one or more buses).

Network access manager 1220 may receive, at the core network node, a request from a UE to attach, via a first RAT, to a first base station in the network.

Network mobility manager 1225 may send, from the core network node to the UE and for one or more geographic areas, an indication of inter-RAT connected-mode mobility between the first RAT and a second RAT. In some cases, sending the indication of inter-RAT connected-mode mobility includes sending a list of one or more geographic areas in which the UE is to initiate an inter-RAT mobility procedure to transition from the first RAT to the second RAT. In some examples, sending the indication of inter-RAT connected-mode mobility includes sending an additional list of one or more geographic areas in which an inter-RAT handover interface is available. In some instances, sending the indication of inter-RAT connected-mode mobility includes sending the indication via a NAS layer. In some aspects, sending the indication of inter-RAT connected-mode mobility includes sending the indication in conjunction with a TAU. In some cases, sending the indication of inter-RAT connected-mode mobility includes sending the indication in conjunction with a registration procedure. In some examples, sending the indication of inter-RAT connected-mode mobility includes sending a list of one or more geographic areas in which an inter-RAT handover interface is not available. In some instances, the first RAT and the second RAT are different generation RATs. For example, in some cases, the first RAT is a LTE RAT and the second RAT is a 5G RAT, and in some cases, the first RAT is a 5G RAT and the second RAT is a LTE RAT.

Network inter-RAT mobility manager 1230 may determine inter-RAT connected-mode mobility based on whether an inter-RAT handover interface is present in the one or more geographic areas.

Figure 13:
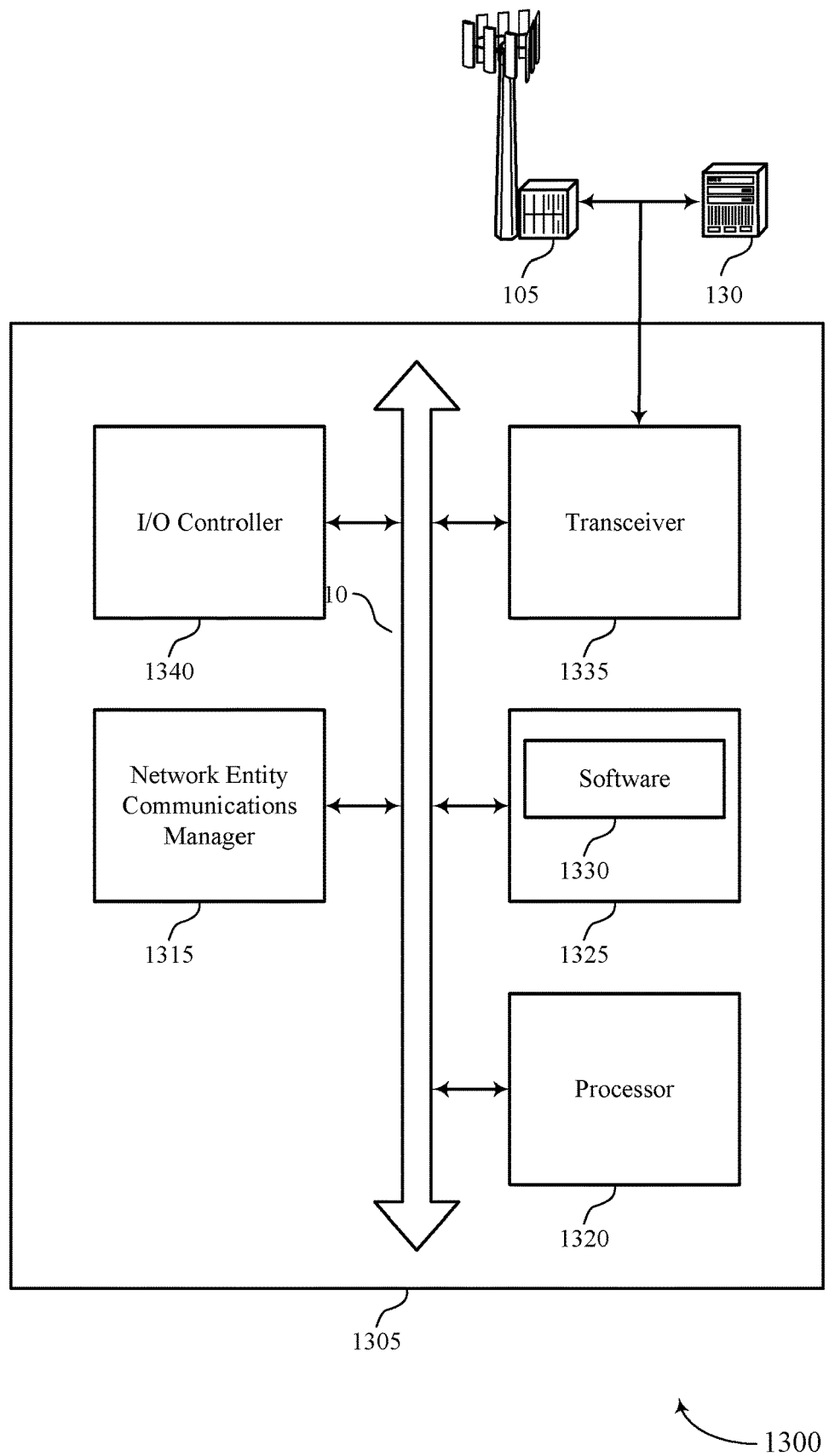
FIG. 13 illustrates a block diagram of a system including a network entity that supports a preemptive indication of inter-RAT mobility in accordance with aspects of the present disclosure.

FIG. 13 shows a diagram of a system 1300 including a device 1305 that supports a preemptive indication of inter-RAT mobility in accordance with aspects of the present disclosure. Device 1305 may be an example of or include the components of a core network 130 or mobility management entity (e.g., an MME 310 or AMF 360) as described above, e.g., with reference to FIG. 1. Device 1305 may include components for bi-directional voice and data communications including components for transmitting and receiving communications, including network entity communications manager 1315, processor 1320, memory 1325, software 1330, transceiver 1335, and I/O controller 1340. These components may be in electronic communication via one or more buses (e.g., bus 1310).

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting a preemptive indication of inter-RAT mobility).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support a preemptive indication of inter-RAT mobility. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. Transceiver 1335 may also include one or more wired interfaces and communicate bi-directionally with another wired transceiver. For example, transceiver 1335 may communicate with other core network 130 nodes or base stations 105 included in a RAN via one or more wired or wireless interfaces, and may communicate with UEs 115 via further communication links supported by base stations 105. In some cases, transceiver 1335 may communicate with UEs 115 via non-access stratum protocols that pass transparently through the RAN.

I/O controller 1340 may manage input and output signals for device 1305. I/O controller 1340 may also manage peripherals not integrated into device 1305. In some cases, I/O controller 1340 may represent a physical connection or port to an external peripheral. In some cases, I/O controller 1340 may utilize an operating system such as iOS®, ANDROID®, MS-DOS®, MS-WINDOWS®, OS/2®, UNIX®, LINUX®, or another known operating system. In other cases, I/O controller 1340 may represent or interact with a modem, a keyboard, a mouse, a touchscreen, or a similar device. In some cases, I/O controller 1340 may be implemented as part of a processor. In some cases, a user may interact with device 1305 via I/O controller 1340 or via hardware components controlled by I/O controller 1340.

Figure 14:
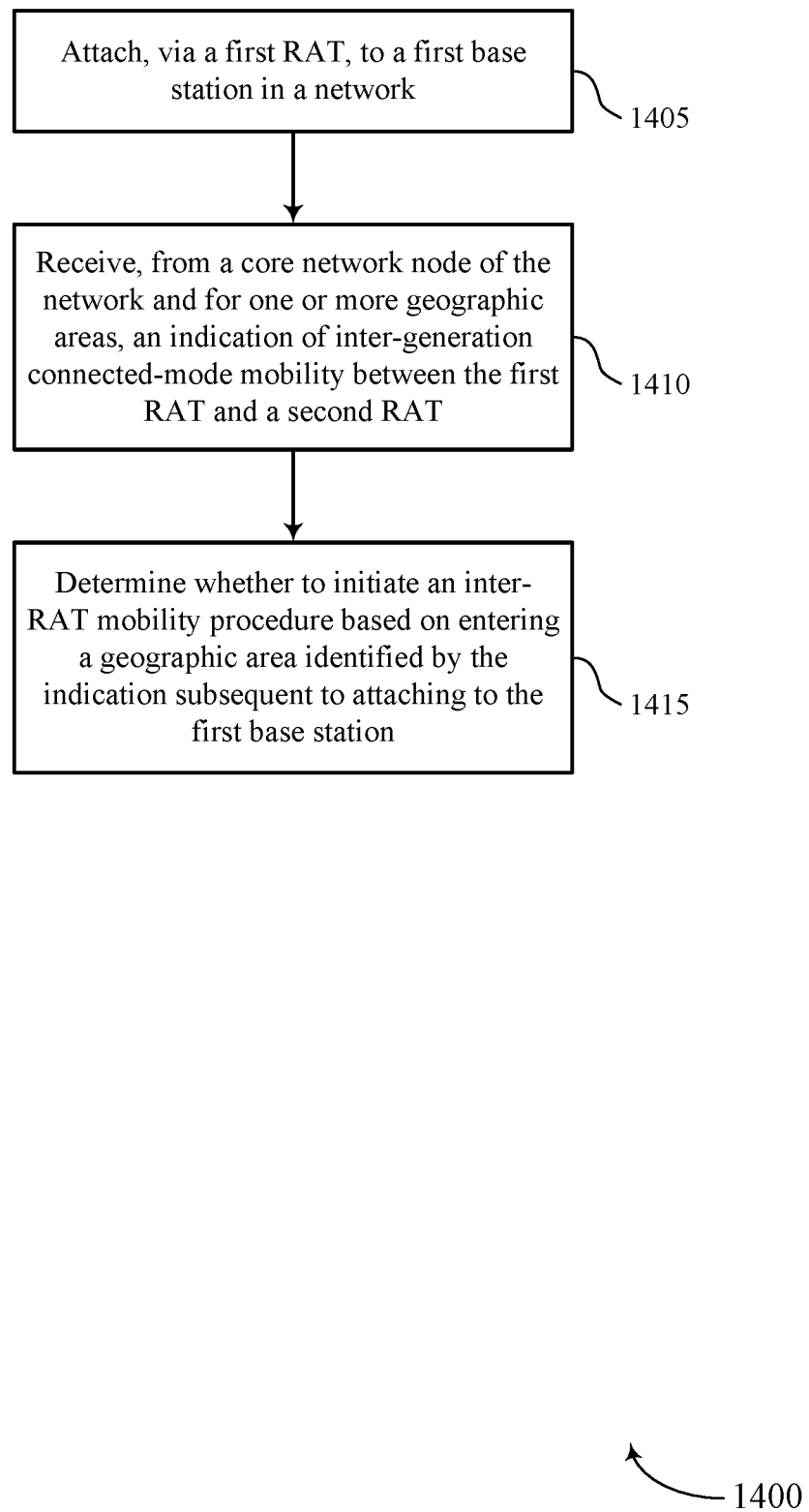
FIGS. 14 through 16 illustrate methods for a preemptive indication of inter-RAT mobility in accordance with aspects of the present disclosure.

FIG. 14 shows a flowchart illustrating a method 1400 for a preemptive indication of inter-RAT mobility in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may attach, via a first RAT, to a first base station in a network. The operations of block 1405 may be performed according to the methods described herein. In certain examples, aspects of the operations of block 1405 may be performed by a attach manager as described with reference to FIGS. 6 through 9.

At block 1410 the UE 115 may receive, from a core network node of the network and for one or more geographic areas, an indication of inter-RAT connected-mode mobility between the first RAT and a second RAT. The operations of block 1410 may be performed according to the methods described herein. In certain examples, aspects of the operations of block 1410 may be performed by a mobility manager as described with reference to FIGS. 6 through 9.

At block 1415 the UE 115 may determine whether to initiate an inter-RAT mobility procedure based at least in part on entering a geographic area identified by the indication subsequent to attaching to the first base station. The operations of block 1415 may be performed according to the methods described herein. In certain examples, aspects of the operations of block 1415 may be performed by a mobility procedure manager as described with reference to FIGS. 6 through 9.

Figure 15:
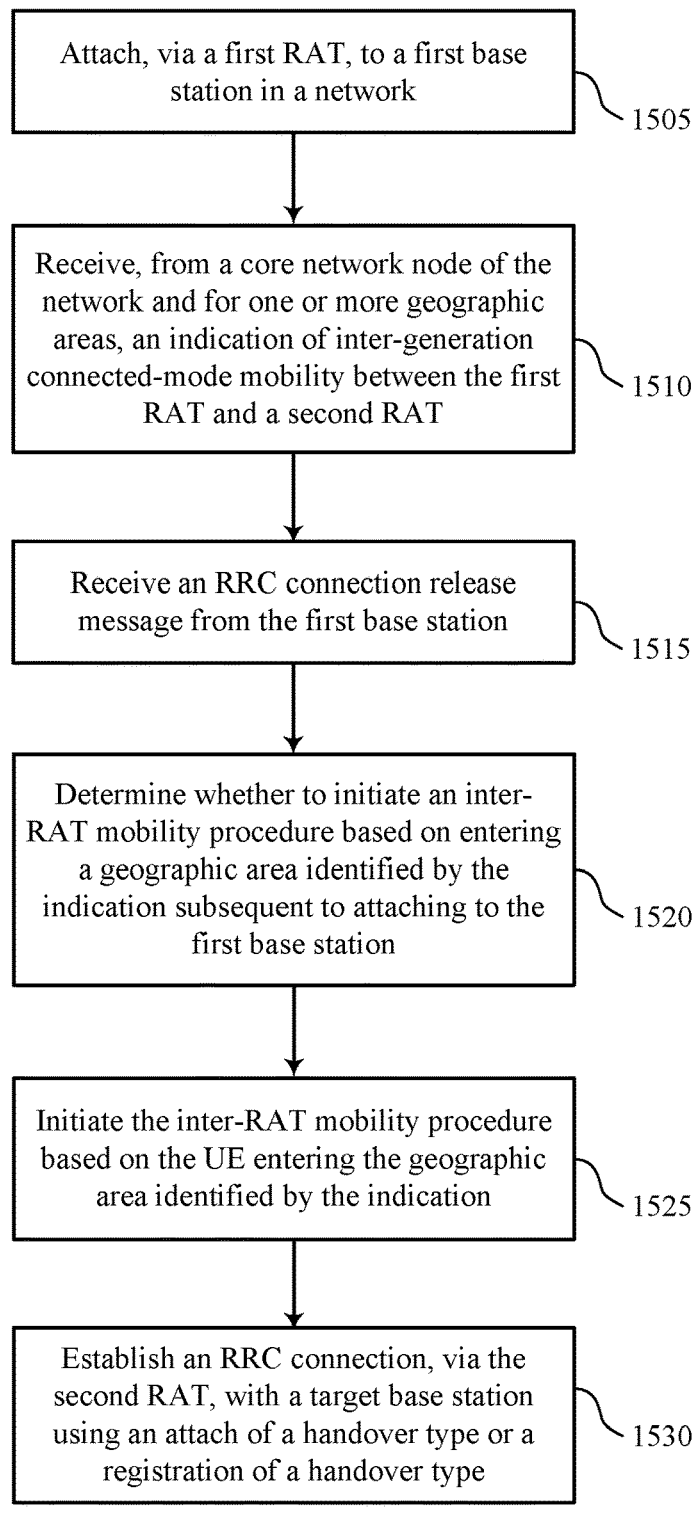

FIG. 15 shows a flowchart illustrating a method 1500 for a preemptive indication of inter-RAT mobility in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may attach, via a first RAT, to a first base station in a network. The operations of block 1505 may be performed according to the methods described herein. In certain examples, aspects of the operations of block 1505 may be performed by a attach manager as described with reference to FIGS. 6 through 9.

At block 1510 the UE 115 may receive, from a core network node of the network and for one or more geographic areas, an indication of inter-RAT connected-mode mobility between the first RAT and a second RAT. The operations of block 1510 may be performed according to the methods described herein. In certain examples, aspects of the operations of block 1510 may be performed by a mobility manager as described with reference to FIGS. 6 through 9.

At block 1515 the UE 115 may receive a RRC connection release message from the first base station. The operations of block 1515 may be performed according to the methods described herein. In certain examples, aspects of the operations of block 1515 may be performed by a RRC connection manager as described with reference to FIGS. 6 through 9.

At block 1520 the UE 115 may determine whether to initiate inter-RAT mobility procedure based at least in part on entering a geographic area identified by the indication subsequent to attaching to the first base station. The operations of block 1515 may be performed according to the methods described herein. In certain examples, aspects of the operations of block 1515 may be performed by a mobility procedure manager as described with reference to FIGS. 6 through 9.

At block 1525 the UE 115 may initiate the inter-RAT mobility procedure based at least in part on the UE entering the geographic area identified by the indication. The operations of block 1520 may be performed according to the methods described herein. In certain examples, aspects of the operations of block 1520 may be performed by a mobility procedure manager as described with reference to FIGS. 6 through 9.

At block 1530 the UE 115 may establish an RRC connection, via the second RAT, with a target base station using an attach of a handover type or a registration of a handover type. The operations of block 1530 may be performed according to the methods described herein. In certain examples, aspects of the operations of block 1530 may be performed by an attach manager as described with reference to FIGS. 6 through 9.

Figure 16:
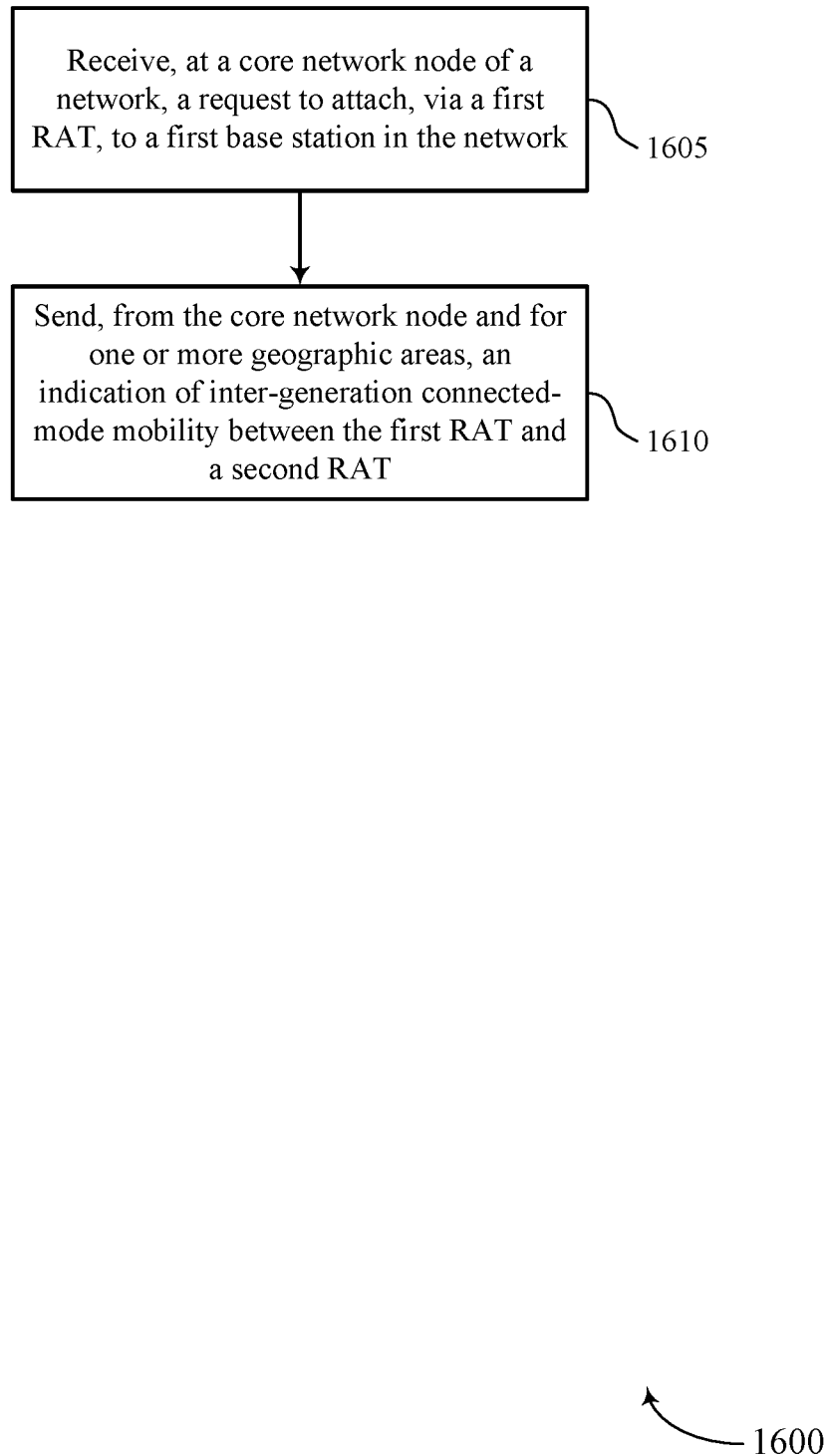

FIG. 16 shows a flowchart illustrating a method 1600 for a preemptive indication of inter-RAT mobility in accordance with aspects of the present disclosure. The operations of method 1600 may be implemented by a core network node, such as an MME 310 or AMF 360, or its components as described herein. For example, the operations of method 1600 may be performed by a network entity communications manager as described with reference to FIGS. 10 through 13. In some examples, a core network node may execute a set of codes to control the functional elements of the device to perform the functions described below. Additionally or alternatively, the core network node may perform aspects of the functions described below using special-purpose hardware.

At block 1605 the core network node may receive, from a UE, a request to attach, via a first RAT, to a first base station in the network. The operations of block 1605 may be performed according to the methods described herein. In certain examples, aspects of the operations of block 1605 may be performed by a network access manager as described with reference to FIGS. 10 through 13.

At block 1610 the core network node may send, to the UE and for one or more geographic areas, an indication of inter-RAT connected-mode mobility between the first RAT and a second RAT. The operations of block 1610 may be performed according to the methods described herein. In certain examples, aspects of the operations of block 1610 may be performed by a network mobility manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    attaching, via a first radio access technology (RAT), to a first base station in a network;
    receiving, while attached to the first base station via the first RAT, an indication from a core network node of the network of inter-RAT connected-mode mobility between the first RAT and a second RAT, wherein the indication comprises a list of one or more geographic areas in which the UE is to initiate an inter-RAT mobility procedure to transition from the first RAT to the second RAT; and
    determining whether to initiate the inter-RAT mobility procedure based at least in part on entering a geographic area identified by the indication subsequent to attaching to the first base station.

2. The method of claim 1, wherein receiving the indication of inter-RAT connected-mode mobility further comprises:
    receiving an additional list of the one or more geographic areas in which an inter-RAT handover interface is available.

3. The method of claim 1, wherein receiving the indication of inter-RAT connected-mode mobility comprises:
    receiving the indication via a non-access stratum (NAS) layer.

4. The method of claim 1, wherein receiving the indication of inter-RAT connected-mode mobility comprises:
receiving the indication in conjunction with a location update procedure.

5. The method of claim 4, wherein the location update procedure comprises a tracking area update (TAU) procedure.

6. The method of claim 4, wherein the location update procedure comprises a registration procedure.

7. The method of claim 1, further comprising:
receiving a Radio Resource Control (RRC) connection release message from the first base station;
initiating the inter-RAT mobility procedure based at least in part on the UE entering the geographic area identified by the indication; and
establishing an RRC connection, via the second RAT, with a target base station using an attach of a handover type or a registration of a handover type.

8. The method of claim 1, wherein the one or more geographic areas in the list comprise one or more geographic areas in which an inter-RAT handover interface is not available.

9. The method of claim 1, wherein the first RAT and the second RAT are different generation RATs.

10. The method of claim 1, wherein the first RAT is a long-term evolution (LTE) RAT and the second RAT is a fifth generation (5G) RAT.

11. The method of claim 1, wherein the first RAT is a fifth generation (5G) RAT and the second RAT is a long-term evolution (LTE) RAT.

12. The method of claim 1, wherein the one or more geographic areas in the list comprise one or more geographic areas in which a type of interface between a respective core network node of the first RAT and a respective second core network node of the second RAT is not available.

13. A method for wireless communication at a core network node of a network, comprising:
receiving, at the core network node, a request for a user equipment (UE) to attach, via a first radio access technology (RAT), to a first base station in the network; and
sending, while the UE is attached to the first base station via the first RAT, an indication from the core network node of inter-RAT connected-mode mobility between the first RAT and a second RAT, wherein the indication comprises a list of one or more geographic areas in which the UE is to initiate an inter-RAT mobility procedure to transition from the first RAT to the second RAT.

14. The method of claim 13, wherein sending the indication of inter-RAT connected-mode mobility comprises:
sending an additional list of the one or more geographic areas in which an inter-RAT handover interface is available.

15. The method of claim 13, wherein sending the indication of inter-RAT connected-mode mobility comprises:
sending the indication via a non-access stratum (NAS) layer.

16. The method of claim 13, wherein sending the indication of inter-RAT connected-mode mobility comprises:
sending the indication in conjunction with a location update procedure.

17. The method of claim 16, wherein the location update procedure comprises a tracking area update (TAU) procedure.

18. The method of claim 16, wherein the location update procedure comprises a registration procedure.

19. The method of claim 13, further comprising:
determining inter-RAT connected-mode mobility based at least in part on whether an inter-RAT handover interface is present in the one or more geographic areas.

20. The method of claim 13, wherein the one or more geographic areas in the list comprise one or more geographic areas in which an inter-RAT handover interface is not available.

21. The method of claim 13, wherein the first RAT and the second RAT are different generation RATs.

22. The method of claim 13, wherein the first RAT is a long-term evolution (LTE) RAT and the second RAT is a fifth generation (5G) RAT.

23. The method of claim 13, wherein the first RAT is a fifth generation (5G) RAT and the second RAT is a long-term evolution (LTE) RAT.

24. The method of claim 13, wherein the one or more geographic areas in the list comprise one or more geographic areas in which a type of interface between a respective core network node of the first RAT and a respective second core network node of the second RAT is not available.

25. An apparatus for wireless communication, comprising:
a processor;
memory in electronic communication with the processor; and
instructions stored in the memory and operable, when executed by the processor, to cause the apparatus to:
attach, via a first radio access technology (RAT), to a first base station in a network;
receive, while attached to the first base station via the first RAT, an indication from a core network node of the network of inter-RAT connected-mode mobility between the first RAT and a second RAT, wherein the indication comprises a list of one or more geographic areas in which a user equipment (UE) is to initiate an inter-RAT mobility procedure to transition from the first RAT to the second RAT; and
determine whether to initiate the inter-RAT mobility procedure based at least in part on entering a geographic area identified by the indication subsequent to attaching to the first base station.

26. The apparatus of claim 25, wherein the instructions to receive the indication of inter-RAT connected-mode mobility are further executable by the processor to cause the apparatus to:
receive an additional list of the one or more geographic areas in which an inter-RAT handover interface is available.

27. The method of claim 25, wherein the one or more geographic areas in the list comprise one or more geographic areas in which a type of interface between a respective core network node of the first RAT and a respective second core network node of the second RAT is not available.

28. An apparatus for wireless communication, comprising:
a processor;
memory in electronic communication with the processor; and
instructions stored in the memory and operable, when executed by the processor, to cause the apparatus to:
receive, at a core network node of a network, a request for a user equipment (UE) to attach, via a first radio access technology (RAT), to a first base station in the network; and
send, while the UE is attached to the first base station via the first RAT, an indication from the core network node of inter-RAT connected-mode mobility between the first RAT and a second RAT, wherein the indication comprises a list of one or more geographic areas in which the UE is to initiate an inter-RAT mobility procedure to transition from the first RAT to the second RAT.

29. The apparatus of claim 28, wherein the instructions to send the indication of inter-RAT connected-mode mobility are further executable by the processor to cause the apparatus to:

send an additional list of the one or more geographic areas in which an inter-RAT handover interface is available.

30. The method of claim 28, wherein the one or more geographic areas in the list comprise one or more geographic areas in which a type of interface between a respective core network node of the first RAT and a respective second core network node of the second RAT is not available.

* * * * *